United States Patent

Momosaki et al.

(10) Patent No.: US 7,979,432 B2
(45) Date of Patent: Jul. 12, 2011

(54) APPARATUS, COMPUTER PROGRAM PRODUCT AND SYSTEM FOR PROCESSING INFORMATION

(75) Inventors: Kohei Momosaki, Tokyo (JP); Yasuyuki Masai, Kanagawa (JP); Tatsuya Uehara, Kanagawa (JP); Taishi Shimomori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 943 days.

(21) Appl. No.: 11/846,025

(22) Filed: Aug. 28, 2007

(65) Prior Publication Data

US 2008/0082523 A1  Apr. 3, 2008

(30) Foreign Application Priority Data

Sep. 28, 2006  (JP) ................. 2006-264838

(51) Int. Cl.
  G06F 7/00   (2006.01)
  G06F 17/30  (2006.01)
(52) U.S. Cl. ...................................... 707/736
(58) Field of Classification Search .................. 707/736
  See application file for complete search history.

(56) References Cited

U.S. PATENT DOCUMENTS

| 2006/0222318 | A1 | 10/2006 | Momosaki et al. |
| 2006/0222327 | A1* | 10/2006 | Abe et al. ........................ 386/83 |
| 2006/0224616 | A1* | 10/2006 | Imoto et al. .................... 707/102 |
| 2006/0239130 | A1 | 10/2006 | Momosaki et al. |
| 2006/0248075 | A1 | 11/2006 | Shimomori et al. |

FOREIGN PATENT DOCUMENTS

| JP | 2001-134613 | 5/2001 |
| JP | 2002-44610 | 2/2002 |
| JP | 2003-30204 | 1/2003 |
| JP | 2003-274320 | 9/2003 |
| JP | 2005-222329 | 8/2005 |
| JP | 2005-303742 | 10/2005 |

OTHER PUBLICATIONS

Hiroshi Mo, et al., "A study on Cooccurrence of Appearance Pattern of Video Features and Its Application", Proceedings of the IEICE Information and Systems Society Conference 2001, Japan , The Institute of Electronics, Information and Communication Engineers, Aug. 29, 2001, 3 cover pages and p. 217.

Hiroshi Mo, et al., "Key shot extraction and indexing in a news video archive", The Institute of Electronics, Information and Communication Engineers Technical Report, vol. 105, No. 118, 4 cover pages and pp. 55-59, Jun. 9, 2005, Abstract Only.

Tatsuhiko Tsunoda, et al., "Automatic Alignment between TV News and Newspaper Articles by String Matching between Captions and Article Texts", Transactions of Information Processing Society of Japan, vol. 38, No. 6, 3 cover pages and pp. 1149-1162, Jun. 17, 1997, Abstract Only.

* cited by examiner

*Primary Examiner* — John R. Cottingham
*Assistant Examiner* — Nicholas E Allen
(74) *Attorney, Agent, or Firm* — Oblon, Spivak, McClelland, Maier & Neustadt, L.L.P.

(57) ABSTRACT

In an information processing apparatus, an extracting unit extracts a feature quantity from a subject content. A detecting unit detects from the second content a similar portion where a degree of coincidence between each feature quantity extracted from the second content and the feature quantity included in the key information is higher than a first threshold value, and outputs range information specifying a range of the similar portion. A correspondence generating unit retrieves the similar portion included in the range indicated by the detected range information, and generates correspondence information associating the retrieved similar portion with the key information. A presenting unit presents the key information selectably based on the correspondence information.

20 Claims, 26 Drawing Sheets

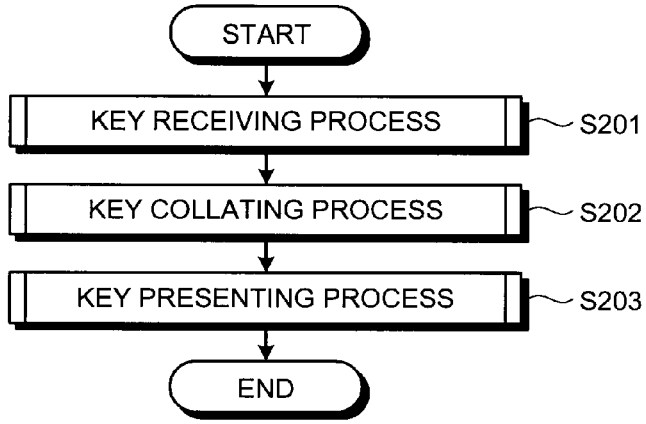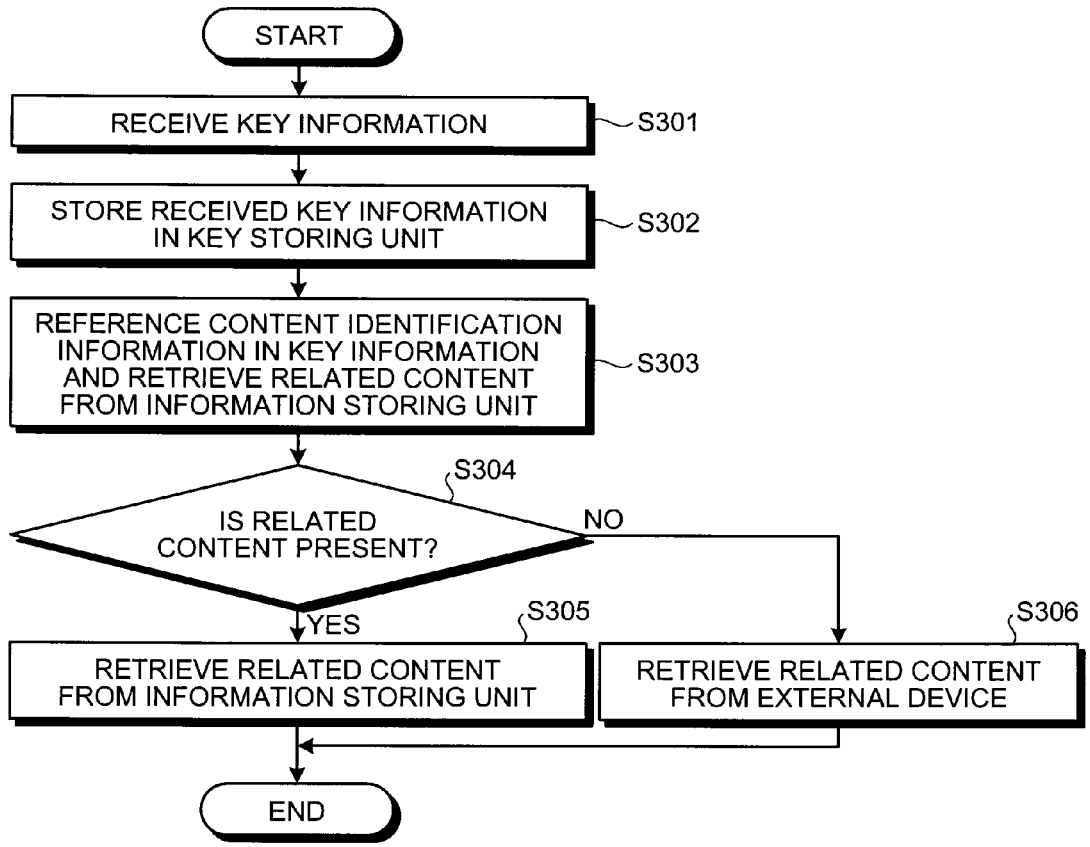

FIG.7

RETRIEVAL KEY (NEW ARRIVAL) LIST                                    701

| | KEY NAME | PROGRAM NAME | CHAPTER NAME | BROADCASTING DATE | GENERATOR | GENERATION DATE |
|---|---|---|---|---|---|---|
| 1 | ★HOROSCOPE★ MOST REVEALING! >>GENERATOR COMMENT:NO MORE MISSED RECORDINGS WITH CORRESPONDENCE TO MONDAY PATTERN! RECOMMENDED!! | FULL OF INFORMATION TO START YOUR MORNING | HOROSCOPE FEATURE | 07/03 (MONDAY) | KAGIKAMI | 07/10♪ |
| 2 | CHECK YOUR HOROSCOPE! | FULL OF INFORMATION TO START YOUR MORNING | HOROSCOPE FEATURE | 07/07 (FRIDAY) | momo | 07/07♪ |
| 3 | OA-Op | OA'S TALK SHOW | OPENING | 07/06 (THURSDAY) | momo | 07/07 |
| 4 | STATION B TRAFFIC REPORT | TRAFFIC INFORMATION BULLETIN | TRAFFIC JAM INFORMATION | 07/06 (THURSDAY) | momo | 07/07♪ |
| 5 | BASEBALL! | (SPORTS NEWS) | (SOUND OF METAL BAT) | | momo | 07/07 |

| RETRIEVAL KEY ID | KEY NAME | TITLE NAME | PROGRAM CATEGORY | RECORDING OPERATION ATTRIBUTE |
|---|---|---|---|---|
| A | HOROSCOPE FEATURE | MORNING INFORMATION TELEVISION SHOW | NEWS INFORMATION/ VARIETY | BGM-1 |
| B | OPENING | EVENING DRAMA SERIES | DRAMA | OPM-1 |
| C | SPORTS CORNER | 10 O'CLOCK NEWS | NEWS SPORTS NEWS | CNM-1 |
| D | SWIMMING START SOUND | (NO TITLE) | NEWS SPORTS | SGE-1 |

| RECORDING OPERATION ATTRIBUTE | START | SECTION | END | TITLE |
|---|---|---|---|---|
| BGM-1 | | MARKER : (KEY)[-#] | | × |
| OPM-1 | CHAPTER: "OP"-# | | CHAPTER: "MAIN CHAPTER"-# | ○ |
| CNM-1 | CHAPTER: (KEY)[-#] | | | ○ |
| SGE-1 | -2s/MARKER: (KEY)-# | | | × |

FIG.22
DATA IN VIDEO-IMAGE RECORDING/
REPRODUCING DEVICE 2010
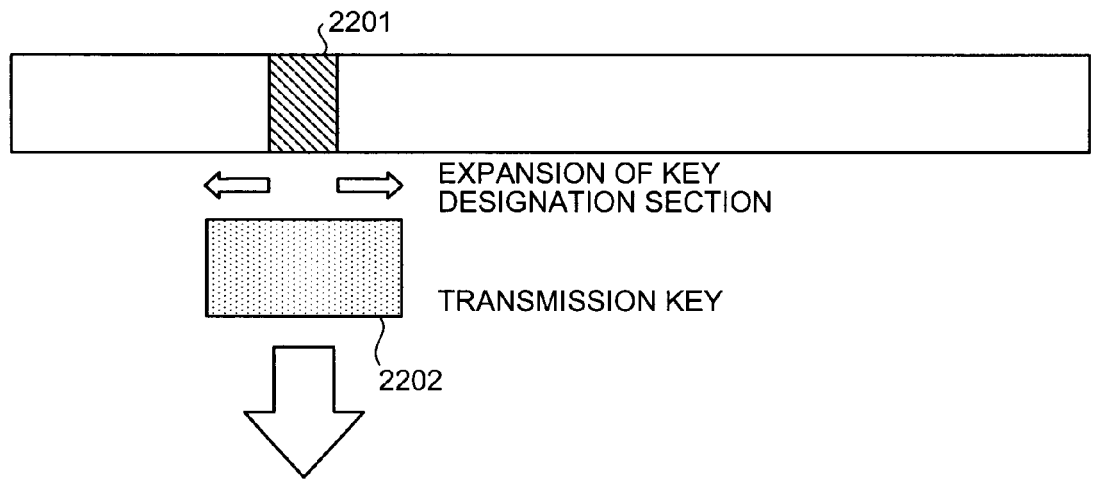
DATA IN VIDEO-IMAGE RECORDING/
REPRODUCING DEVICE 2020
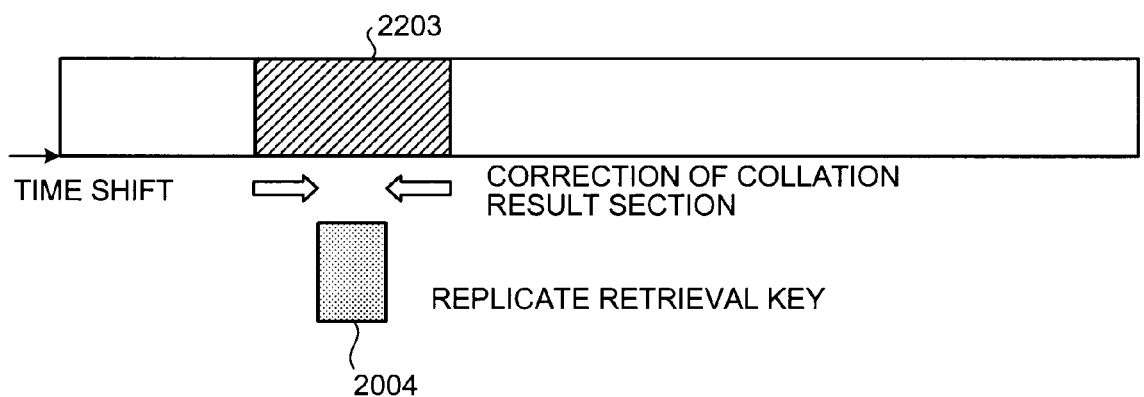

FIG.25

| RETRIEVAL KEY ID | KEY NAME | PROGRAM ID | PROGRAM NAME/ PROGRAM SERIES NAME | PROGRAM CATEGORY | BROAD- CASTING DATE | CH/ BROADCASTING STATION | SECTION |
|---|---|---|---|---|---|---|---|
| A | HOROSCOPE FEATURE | 77101 | MORNING INFORMATION TELEVISION SHOW | NEWS INFORMATION/ VARIETY | 2006/07/03 (MONDAY) 06:30-8:30 | 21/TVX | 00:28:35.00- 00:28:39.80 | 2501
| B | OPENING | 69501 | EVENING DRAMA SERIES | DRAMA | 2006/07/09 (SUNDAY) 21:00-21:54 | 21/TVX | 00:16:15.20- 00:17:29.80 | 2502
| D | SWIMMING START SOUND | 79981 | TODAY'S SPORTS | SPORTS NEWS | 2006/07/06 (THURSDAY) 23:10-23:50 | 25/BSX | 00:27:13.70- 00:27:14.10 | 2503

FIG.26

| RETRIEVAL KEY ID | PROGRAM ID | PROGRAM NAME/ PROGRAM SERIES NAME | PROGRAM CATEGORY | BROAD-CASTING DATE | CH/ BROADCASTING STATION | SECTION | ORDER OF PRIORITY |
|---|---|---|---|---|---|---|---|
| A | 77101 | MORNING INFORMATION TELEVISION SHOW | NEWS INFORMATION/ VARIETY | 2006/07/03 (MONDAY) 06:30-8:30 | 21/TVX | 00:28:35.00-00:28.39.80 | 0 |
| A | 78101 | MORNING INFORMATION TELEVISION SHOW | NEWS INFORMATION/ VARIETY | 2006/07/07 (FRIDAY) 06:30-8:30 | 21/TVX | 00:28:34.50-00:28.39.30 | 2 |
| A | 79101 | MORNING INFORMATION TELEVISION SHOW | NEWS INFORMATION/ VARIETY | 2006/07/10 (MONDAY) 06:30-8:30 | 21/TVX | 00:28:34.60-00:28.39.40 | 2 |
| B | 69501 | EVENING DRAMA SERIES | DRAMA | 2006/07/09 (SUNDAY) 21:00-21:54 | 21/TVX | 00:16:15.20-00:15.29.80 | 0 |
| B | 69051 | EVENING DRAMA SERIES (NEW)/ EVENING DRAMA SERIES | DRAMA | 2006/07/02 (SUNDAY) 21:00-22:24 | 21/TVX | 00:21:15.20-00:22.29.80 | 2 |
| B | 97801 | EVENING DRAMA SERIES SPECIAL/ EVENING DRAMA SERIES | DRAMA | 2006/07/15 (SATURDAY) 15:30-16:00 | 21/TVX | 00:00:05.20-00:01.19.80 | 3 |
| D | 79981 | TODAY'S SPORTS | SPORTS NEWS | 2006/07/06 (THURSDAY) 23:10-23:50 | 25/BSX | 00:27:13.80-00:27.14.20 | 0 |
| D | 79981 | TODAY'S SPORTS | SPORTS NEWS | 2006/07/06 (THURSDAY) 23:10-23:50 | 25/BSX | 00:27:36.50-00:27.36.90 | 1 |
| D | 79981 | TODAY'S SPORTS | SPORTS NEWS | 2006/07/06 (THURSDAY) 23:10-23:50 | 25/BSX | 00:27:50.20-00:27.50.60 | 1 |
| D | 78101 | MORNING INFORMATION TELEVISION SHOW | NEWS INFORMATION/ VARIETY | 2006/07/07 (FRIDAY) 06:30-8:30 | 21/TVX | 00:17:13.80-00:17.14.20 | 4 |
| D | 78101 | MORNING INFORMATION TELEVISION SHOW | NEWS INFORMATION/ VARIETY | 2006/07/7 (FRIDAY) 06:30-8:30 | 21/TVX | 00:49:43.30-00:49.43.70 | 4 |

| RETRIEVAL KEY ID | PROGRAM ID | PROGRAM NAME/ PROGRAM SERIES NAME | PROGRAM CATEGORY | BROADCASTING DATE | CH/ BROADCASTING STATION | SECTION | ORDER OF PRIORITY |
|---|---|---|---|---|---|---|---|
| A | 78101 | MORNING INFORMATION TELEVISION SHOW | NEWS INFORMATION/ VARIETY | 2006/07/07 (FRIDAY) 06:30-8:30 | 61/TVZ | 00:28:34.50-00:28:39.30 | 3 |
| A | 79101 | MORNING INFORMATION TELEVISION SHOW | NEWS INFORMATION/ VARIETY | 2006/07/10 (MONDAY) 06:30-8:30 | 61/TVZ | 00:28:34.60-00:28:39.40 | 3 |
| A | 79401 | MORNING INFORMATION TELEVISION SHOW | NEWS INFORMATION/ VARIETY | 2006/07/11 (TUESDAY) 06:30-8:30 | 61/TVZ | 00:28:34.40-00:28:39.20 | 4 |
| B | 97801 | EVENING DRAMA SERIES SPECIAL/EVENING DRAMA SERIES | DRAMA | 2006/07/15 (SATURDAY) 15:30-16:00 | 61/TVZ | 00:00:05.50-00:01:20.10 | 10 |
| B | 69511 | EVENING DRAMA SERIES | DRAMA | 2006/07/16 (SUNDAY) 21:00-21:54 | 61/TVZ | RECORDING RESERVATION | 4 |
| D | 79981 | TODAY'S SPORTS | SPORTS NEWS | 2006/07/06 (THURSDAY) 23:10-23:50 | 25/BSX | 00:27:13.70-00:27:14.10 | 1 |
| D | 79981 | TODAY'S SPORTS | SPORTS NEWS | 2006/07/06 (THURSDAY) 23:10-23:50 | 25/BSX | 00:27:36.40-00:27:36.80 | 2 |
| D | 79981 | TODAY'S SPORTS | SPORTS NEWS | 2006/07/06 (THURSDAY) 23:10-23:50 | 25/BSX | 00:27:50.10-00:27:50.40 | 2 |
| D | 78101 | MORNING INFORMATION TELEVISION SHOW | NEWS INFORMATION/ VARIETY | 2006/07/07 (FRIDAY) 06:30-8:30 | 61/TVZ | 00:17:13.80-00:17:14.20 | 15 |
| D | 78101 | MORNING INFORMATION TELEVISION SHOW | NEWS INFORMATION/ VARIETY | 2006/07/7 (FRIDAY) 06:30-8:30 | 61/TVZ | 00:49:43.30-00:49:43.70 | 15 |

APPARATUS, COMPUTER PROGRAM PRODUCT AND SYSTEM FOR PROCESSING INFORMATION

CROSS-REFERENCE TO RELATED APPLICATIONS

This application is based upon and claims the benefit of priority from the prior Japanese Patent Application No. 2006-264838, filed on Sep. 28, 2006; the entire contents of which are incorporated herein by reference.

BACKGROUND OF THE INVENTION

1. Field of the Invention

The present invention relates to an apparatus, a computer program product and a system for processing content information including video images and/or audio.

2. Description of the Related Art

In recent years, mainstream devices that record audio and video images have transitioned from conventional magnetic tapes in analog format to magnetic disks, semiconductor memories, and the like in digital format. Recording capacity has been increasing dramatically, particularly in video recording and reproducing devices using a large-capacity hard disk. Through use of such devices, video images of a large number of programs provided via broadcasts and transmissions can be stored. A user can select the programs as desired, and view and listen to the selected programs.

To manage the stored video images, after a file is created under a title (program), a name and other information can be attached. The title is a unit of a program or the like. When listing the video images, representative images (thumbnails), names, and the like can be arranged and displayed. A single program (title) can be divided into units called chapters (segments). Reproduction and editing can be performed by chapter units. Chapter names can be attached. The representative images (thumbnails) of the chapters can be displayed. As a result, a chapter including a desired scene can be selected from a chapter list, and the selected chapter can be reproduced. In addition, a playlist or the like can be created by selected chapters being arranged. Video recording (VR) mode of a digital versatile disk (DVD) is provided to regulate the above-described management methods.

A marker used to designate a section or a position within the program (title) includes reproduction time information corresponding with a temporal position at which a video image and audio content is reproduced. In addition to a chapter marker indicating a chapter division point, an edit marker and an index marker may be used, depending on a device. The edit marker designates a subject section to which an editing operation is performed. The index marker designates a jump destination point when a cueing operation is performed. "Marker" in the present specification refers to the above.

If program information provided by an electronic program guide (EPG) or the like is used, a program name can be automatically attached to a file of a video image that has been recorded and stored. Association of Radio Industries and Businesses (ARIB) standard (STD-B10) is the program information provided by the EPG.

Within the single program, various data can be considered as metadata that effectively supports and automates viewing, editing, and the like. The various data includes information providing a temporal position at which the program is divided, names facilitating identification of each divided section, and the like. However, the metadata are rarely provided from an external source for general use. Therefore, in devices to be used by general viewers, the metadata is required to be generated by the device-end, based on recorded audio and video images.

Moving picture experts group (MPEG)-7 is a description format of the metadata for general use relating to video image and audio contents. There is a method in which the metadata are correlated with the contents and stored in an extensible markup language (XML) database. ARIB standard (STD-B38) is a system for transmitting the metadata during broadcasting and the like. The metadata can be recorded in compliance with the standard.

At the same time, as a method for retrieving video images or the like stored in a video-image recording/reproducing device, a method is known in which retrieval is performed using a feature quantity as a retrieval key. The feature quantity indicates an information characteristic extracted from information of the video image or the like. For example, in JP-A 2001-134613 (KOKAI), a following sound retrieval technology is proposed. In the sound retrieval technology, a user designates a section by listening to or viewing a sound signal or a video image signal of an extraction source from which the feature quantity has been extracted. The user registers the extracted sound feature quantity in a retrieving unit as the retrieval key. As a result, a matching or similar sound is retrieved.

In JP-A 2002-44610 (KOKAI), a technology is proposed in which a similar image is retrieved by the retrieval key being generated using the feature quantity of an image. Based on results of a sound retrieval or a video image retrieval, such as that described above, for example, similar sound contents or similar video image contents can be displayed, similar areas within the content can be displayed, structuring can be performed, and the metadata can be added.

An ordinary encoding can be performed on information in the retrieval key used in such retrievals so that an original sound or video image can be decoded to a listenable or viewable degree. The information can be, for example, pulse code modulation (PCM) data, MPEG data, or joint photographic experts group (JPEG) data.

However, ordinarily, the retrieval is required to be performed at a high-speed or index information size is required to be reduced. Therefore, a retrieval key having a significantly reduced amount of information is used. In other words, image information in a block unit so large that the image information is visually meaningless, information in which a plurality of feature quantities are inseparably combined, information encoded using rough quantization, information using a partial characteristic of a sound, such as a number of zero crossings, information in which a feature quantity during a fixed period of time is shown in a histogram, and the like are used. The original sound, video image, or image cannot be directly decoded from the feature quantities used in retrievals.

When the feature quantity of an audio or a video image is used as the retrieval key when retrieving the video image, the audio, or the like, it is generally presumed that the retrieval key is used within the device that generated the retrieval key. At the same time, if the video image or the like can be retrieved using a retrieval key generated in another device, user convenience is enhanced. For example, a reduction in a load attributed to retrieval key generation can be achieved. In this case, it is preferable that the video image or the audio that is the extraction source of the feature quantity can be confirmed to allow selection of a suitable retrieval key and the like.

However, for example, when a corresponding video image or audio is provided with the retrieval key to another device via communication or the like, in addition to copyright problems, a problem occurs in that an amount of communication increases as a result of transmission and reception of video image data and audio data generally having large amounts of information.

SUMMARY OF THE INVENTION

According to one aspect of the present invention, an information processing apparatus includes a key storing unit capable of storing key information including a feature quantity of a focused portion in a first content; a key receiving unit that receives the key information from another information processing apparatus connected via a network and stores the received key information in the key storing unit; a retrieving unit that retrieves a second content; an extracting unit that extracts temporally sequential feature quantities from the second content; a detecting unit that detects from the second content a similar portion where a degree of coincidence between each feature quantity extracted from the second content and the feature quantity included in the key information is higher than a first threshold value, and outputs range information specifying a range of the similar portion; a correspondence generating unit that retrieves the similar portion included in the range indicated by the detected range information, and generates correspondence information associating the retrieved similar portion with the key information; and an outputting unit that outputs the key information selectably based on the generated correspondence information.

According to another aspect of the present invention, a computer program product having a computer readable medium including programmed instructions for processing a content, wherein the instructions, when executed by a computer, cause the computer to perform: receiving key information including a feature quantity of a focused portion of a first content from another information processing apparatus connected via a network; storing the received key information in a key storing unit; retrieving a second content; extracting temporally sequential feature quantities from the second content; detecting from the second content a similar portion where a degree of coincidence between each feature quantity extracted from the second content and the feature quantity included in the key information is higher than a first threshold value; outputting range information specifying a range of the similar section; retrieving the similar portion included in the range indicated by the detected range information; generating correspondence information associating the retrieved similar portion with the key information; and outputting the key information selectably based on the generated correspondence information.

According to still another aspect of the present invention, an information processing system includes a first information processing apparatus that generates a retrieval key for a retrieved first content; and a second information processing apparatus that is connected to the first information processing apparatus via a network and retrieves a second content relating to the retrieval key, wherein the first information processing apparatus includes a first retrieving unit that retrieves the first content, a designation receiving unit that receives a designation of a subject content that is a portion or all of the retrieved first content and from which a feature quantity indicating a characteristic of the first content is to be extracted, a key generating unit that extracts the feature quantity from the subject content to which the designation has been received, and generates key information including the extracted feature quantity as the retrieval key of the content, and a key transmitting unit that transmits the generated key information to the second information processing apparatus, and the second information processing apparatus includes a key storing unit capable of storing the key information, a key receiving unit that receives the key information from the first information processing apparatus and stores the received key information in the key storing unit, a second retrieving unit that retrieves the second content, an extracting unit that extracts temporally sequential feature quantities from the second content, a detecting unit that detects from the second content a similar portion where a degree of coincidence between each feature quantity extracted from the second content and the feature quantity included in the key information is higher than a first threshold value, and outputs range information specifying a range of the similar portion, a correspondence generating unit that retrieves the similar portion included in the range indicated by the detected range information, and generates correspondence information associating the retrieved similar portion with the key information, and a outputting unit that outputs the key information selectably based on the generated correspondence information.

According to still another aspect of the present invention, an information processing system includes a first information processing apparatus that generates a retrieval key for a retrieved first content; a server apparatus that is connected to the first information processing apparatus via a network and manages a retrieval key; and a second information processing apparatus that is connected to the server apparatus via the network and retrieves a second content relating to the retrieval key, wherein, the first information processing apparatus includes a first retrieving unit that retrieves the first content, a designation receiving unit that receives a designation of a subject content that is a portion or all of the retrieved first content and from which a feature quantity indicating a characteristic of the first content is to be extracted, a key generating unit that extracts the feature quantity from the subject content to which the designation has been received, and generates key information including the extracted feature quantity as the retrieval key of the content, and a first key transmitting unit that transmits the generated key information to the server apparatus, the server apparatus includes a first key storing unit capable of storing the key information, a first key receiving unit that receives the key information from the first information processing apparatus and stores the received key information in the first key storing unit, a request receiving unit that receives a request message requesting to retrieve the key information, and a second key transmitting unit that retrieves the key information from the first key storing unit in correspondence with the received request message and transmits the retrieved key information to the second information processing unit, and the second information processing apparatus includes a second key storing unit capable of storing the key information, a second key receiving unit that receives the key information from the server apparatus and stores the received key information in the second key storing unit, a second retrieving unit that retrieves the second content, an extracting unit that extracts temporally sequential feature quantities from the second content, a detecting unit that detects from the second content a similar portion where a degree of coincidence between each feature quantity extracted from the second content and the feature quantity included in the key information is higher than a first threshold value, and outputs range information specifying a range of the similar portion, a correspondence generating unit that retrieves the similar portion included in the range indicated by the detected range information, and generates correspondence information associating the retrieved similar portion with the key information, and a outputting unit that outputs the key information selectably based on the generated correspondence information.

BRIEF DESCRIPTION OF THE DRAWINGS

FIG. 2 is a flowchart of an overall flow of an information processing according to the first embodiment;

FIG. 3 is a flowchart of an overall flow of a key receiving process according to the first embodiment;

FIG. 7 is an explanatory diagram showing an example of a display screen;

FIG. 13 is an explanatory diagram showing an example of key-related information including a recording operation attribute;

FIG. 22 is a schematic diagram showing an expansion of a key designation section and a key replication operation according to the fourth embodiment;

FIG. 25 is a schematic diagram showing an example of key-related information;

FIG. 26 is a schematic diagram showing an example of the key-related information;

FIG. 27 is a schematic diagram showing an example of the key-related information.

DETAILED DESCRIPTION OF THE INVENTION

Exemplary embodiments of the present invention are below described with reference to the attached drawings.

An information processing apparatus according to a first embodiment receives a retrieval key generated by another information processing apparatus. Using a feature quantity of a content included in the received retrieval key, the information processing apparatus acquires another content relating to the included content and allows presentation of the other content in correspondence with the retrieval key.

Hereafter, an example in which the information processing apparatus is actualized as a video-image recording/reproducing device is described. The video-image recording/reproducing device is, for example, a video recorder with a hard disk drive (HDD) that records a video image onto a hard disk and reproduces the video image. Applicable devices are not limited thereto. The present invention can be applied to any device as long as the device performs retrieval using the feature quantity extracted from the content as the retrieval key. Subject contents are not limited to video images. The subject contents can also be video images including audio or only audio. For example, the information processing apparatus can be actualized as a music reproducing device with a built-in HDD.

Figure 1:
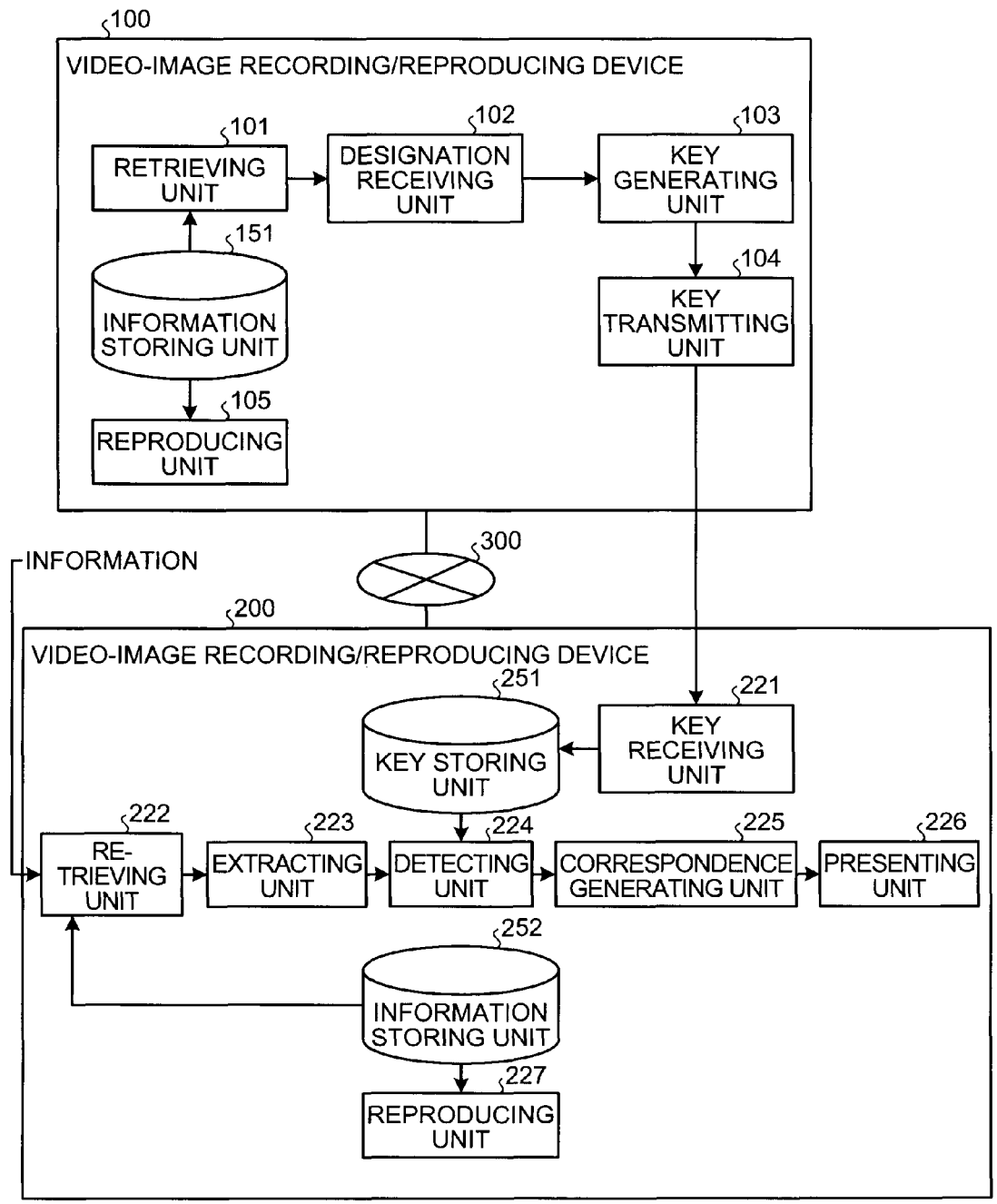
FIG. 1 is a block diagram showing a configuration of an information processing system according to a first embodiment.

FIG. 1 is a block diagram showing a configuration of an information processing system including a video-image recording/reproducing device 200 and a video-image recording/reproducing device 100, according to the first embodiment. The video-image recording/reproducing device 100 is the other information processing apparatus. The video-image recording/reproducing device 200 is connected to the video-image recording/reproducing device 100 via a network 300, such as the internet.

The video-image recording/reproducing device 100 includes an information storing unit 151, a retrieving unit 101, a designation receiving unit 102, a key generating unit 103, a key transmitting unit 104, and a reproducing unit 105.

The information storing unit 151 stores video image information retrieved in advance. The information storing unit 151 can include any commonly-used storage medium, such as the HDD, a random access memory (RAM), an optical disc, or a memory card. In the information storing unit 151, content identification information is correlated with each piece of video image information and stored. The content identification information is, for example, identification information uniquely identifying a content (such as a program identification [ID]), a content name, a content type, a content provider (broadcasting station), and a provision date (broadcasting date). The information storing unit 151 also stores information used to divide the video image into video image title units, chapter units, and the like, and information relating to the names, attributes, and the like of the divided units.

The retrieving unit 101 reads the video image information recorded in the information storing unit 151 and retrieves the video image information. The retrieving unit 101 can also retrieve the video image information by reading analog video image and audio signals and converting the analog video image and audio signals to digital video image and audio data. In addition to these processes, the retrieving unit 101 can perform a decryption process (for example, broadcast satellite conditional access system [B-CAS]), a decoding process (for example, MPEG-2 advanced audio coding [AAC]), a format converting process (for example, from transport stream [TS] to program stream [PS]), a rate (compression rate) converting process, and the like on the video image information, as required.

The retrieving unit 101 separates image data from the video image and audio data and sends the separated data to the key generating unit 103. For example, the retrieving unit 101 performs demultiplexing (Demux) on MPEG-2 data and extracts MPEG-2 Audio ES including the audio data or MPEG-2 video ES including the image data. Then, the retrieving unit 101 decodes the MPEG-2 Audio ES or the MPEG-2 video ES.

The designation receiving unit 102 receives an input of key designation information. The key designation information designates all or some sections of the video image information retrieved by the retrieving unit 101. For example, the designation receiving unit 102 receives the key designation information designating a section designated through a user operation using a device, such as a mouse or a remote control. The video image information can be reproduced, and the user can designate starting and ending positions while checking the video image information. In addition, a chapter can be selected from a chapter name list or the like, and the entire selected chapter can be regarded as the designated section.

The key generating unit 103 extracts all or some sections of the video image and audio data retrieved by the retrieving unit 101, in adherence to the key designation information received by the designation receiving unit 102. The key generating unit 103 generates feature quantity data of the video image or the audio to be used as the retrieval key by a detecting unit 224, described hereafter. The key generating unit 103 generates key information including the generated feature quantity data as the retrieval key.

An ordinary encoding of the audio allows the data to be decoded to enable listening and is, for example, PCM or MP3. The feature quantity data of the audio generated by the key generating unit 103 is not in the ordinary encoding, but is a characteristic of the audio data that has been extracted and parameterized. A feature quantity that does not allow an original sound to be directly decoded is applicable. For example, the feature quantity is a frequency spectrum during a fixed period of time, shown in a histogram.

An ordinary encoding of the video image allows the data to be decoded to enable viewing and listening and is, for example, JPEG if the video image is a still image and MPEG or the like if the video image is a moving image. The feature quantity data of the video image generated by the key generating unit 103 is not in the ordinary encoding, but is a characteristic of the video and audio data that has been extracted and parameterized. For example, respective extracted averages and histograms of luminance, hue, color saturation of 48 areas of a screen divided into 8×6 blocks are image information in block units so large that the image information is visually meaningless. A feature quantity that does not allow an original video image to be decoded to a viewable or listenable degree is applicable.

When a high-speed retrieval is required or a reduction in index information size is required, the key generating unit 103 generates the feature quantity data that does not allow the original video image or audio to be directly decoded to a viewable or listenable degree, in response to use of a retrieval key having a significantly reduced amount of information. For example, the feature quantity is a power of each frequency band or an entire frequency spectrum, an amount encoded using rough quantization, a number of zero crossings, or the like. Information in which a plurality of feature quantities is inseparably combined, information in which a feature quantity during a fixed period of time is shown in a histogram, and the like have similar properties.

The key generating unit 103 can encrypt the feature quantity data to which the ordinary encoding has been performed. The ordinary encoding allows the data to be decoded to enable viewing and listening. The encrypted feature quantity data can be decoded (decrypted) for limited use, such as for generating the retrieval key within the device. In this case, the feature quantity data cannot be decrypted for general use, such as for viewing and listening, outside of the device. Even within the device, a guarantee is required that the feature quantity data will not be decoded to enable viewing and listening and reproduced. In other words, restorable information is protected and cannot be reproduced. Therefore, this is effectively equivalent to the feature quantity data not including information to enable reproduction.

The key generating unit 103 can include a name of a feature quantity data (retrieval key) generator, a generation date, a retrieval key name, a program/title name, the broadcasting date, comments, and the like in the key information. In this case, for example, the user can input the information as required from an inputting unit (not shown).

In addition to the key information to be transmitted to the video-image recording/reproducing device 200 by the key transmitting unit 104, described hereafter, the key generating unit 103 can generate information used for other purposes. For example, the key generating unit 104 can generate information to which the ordinary encoding has been performed to reproduce the video image and audio data of a key section or perform key collation within the video-image recording/reproducing device 100. The ordinary encoding allows the information to be decoded to enable viewing and listening.

The key transmitting unit 104 transmits the key information generated by the key generating unit 103 to the video image recording and reproducing unit 200, via the network 300.

The reproducing unit 105 performs a process for reading the video image information recorded in the image storing unit 151 and reproducing the video image information, depending on user operations and the like. As a result of the reproducing unit 105 reproducing the video image information, the reproduced video image is displayed in a display device (not shown). The reproducing unit 105 reproduces the video image information by performing a decoding process or the like on the video image information, using a common, conventionally used method, and a video image and audio signal outputting process.

The video-image recording/reproducing device 200 includes a key storing unit 251, an information storing unit 252, a key receiving unit 221, an retrieving unit 222, an extracting unit 223, a detecting unit 224, a correspondence generating unit 225, a presenting unit 226, and a reproducing unit 227.

The key storing unit 251 stores the key information received by the key receiving unit 221, described hereafter. The information storing unit 252 stores the video image information retrieved in advance, as does the information storing unit 151 of the video-image recording/reproducing device 100. The key storing unit 251 and the information storing unit 252 can include any commonly used storing medium, such as the HDD, the RAM, the optical disc, or the memory card.

The key receiving unit 221 receives the key information transmitted from the video-image recording/reproducing device 100 and stores the received key information in the key storing unit 251.

The retrieving unit 222 retrieves video image and audio data inputted from an external digital video camera, an external digital microphone, an external reception tuner for digital broadcasts and the like, or other external digital devices. The retrieving unit 222 stores the video image and audio data in the information storing unit 252. The retrieving unit 222 also retrieves video image and audio data from the video image and audio data already recorded in the information storing unit 252.

In addition to recording the video image and audio data, the retrieving unit 222 separates the image data from the video image and audio data and sends the separated data to the detecting unit 224. For example, the retrieving unit 222 performs demultiplexing (Demux) on the MPEG-2 data and extracts the MPEG-2 video ES including the image data. Then, the retrieving unit 222 decodes the MPEG-2 video ES.

After retrieving the analog video image and audio signals from the external video camera, the external microphone, the external broadcast reception tuner, or the other external devices and converting the analog video image and audio signals to the digital video image and audio data, the retrieving unit 222 can record the digital video image and audio data in the information storing unit 252.

In addition to these processes, the retrieving unit 222 can perform the decryption process, the decoding process, the format converting process, the rate (compression rate) converting process, and the like, on the video image and audio data, as required. To retrieve the video image and audio data relating to the retrieval key, the retrieving unit 222 can reference the program/title name and the broadcasting date included in the key information, and select and retrieve the video image and audio data of a broadcasted program. For example, to retrieve a program matching a program name included in the key information, a channel corresponding to the program can be set and reception of the broadcast can be started.

The extracting unit 223 extracts the feature quantity data from the video image and audio data retrieved by the retrieving unit 222. The extracting unit 223 extracts the feature quantity data from an arbitrary section of the retrieved video image and audio data. The extracting unit 223 extracts the feature quantity data using a same method that used by the key generating unit 103 of the video image recording and reproducing unit 100.

The detecting unit 224 collates the feature quantity data extracted by the extracting unit 223 and the feature quantity data included in the retrieval key stored in the key storing unit 251, in adherence to a predetermined condition. The detecting unit 224 detects range information indicating a range within the retrieved video image and audio data to which the extracted feature quantity corresponds.

In this way, "collation" of the feature quantity data refers to a comparison of the feature quantity data of a subject data (audio data or video image and audio data) and the feature quantity data within the key information and a detection of whether any position or section within the subject data corresponds to the feature quantity data within the key information.

The correspondence generating unit 225 references the range information detected by the detecting unit 224 and retrieves the video image and audio data included within the range indicated by the range information as the video image and audio data of a section corresponding with the retrieval key. The correspondence generating unit 225 generates correspondence information in which the retrieved video image and audio data are correlated with the key information. The correspondence generating unit 225 also includes the program/title name of the video image and audio data, subtitle data corresponding with the extracted video image and audio data, and the like in the correspondence information.

The presenting unit 226 displays the key information stored in the key storing unit 251 using the correspondence information generated by the correspondence generating unit 225. Details of a display screen on which the key information is displayed will be described hereafter.

The presenting unit 226 can display all pieces of key information stored in the key storing unit 251 in a list. Alternatively, the presenting unit 226 can display only key information newly received by the key receiving unit 221 (new arrival keys). The presenting unit 226 can also compare content identification information relating to a video image information reproduced by the reproducing unit 227, described hereafter, and content identification information included in the key information stored in the key storing unit 251. The video image information reproduced by the reproducing unit 227 is read from the information storing unit 252 or received by a broadcast. The presenting unit 226 can extract the key information (current program related key) including the same or similar content identification information.

The reproducing unit 227 performs the process for reading the video image information recorded in the information storing unit 252 and reproducing the video image information, same as the reproducing unit 105 of the video-image recording/reproducing device 100.

Next, information processing performed by the video-image recording/reproducing device 200 according to the first embodiment, configured as described above, will be described. FIG. 2 is a flowchart of an overall flow of the information processing according to the first embodiment.

The information processing performed by the video-image recording/reproducing device 200 according to the first embodiment is divided into three processes: a key receiving process (Step S201), a key collating process (Step S202), and a key presenting process (Step S203). In the key receiving process, the key information is received from the video-image recording/reproducing device 100. In the key collating process, the feature quantity data included in the received key information and the feature quantity data extracted from the video image information retrieved within the video-image recording/reproducing device 200 itself are collated. In the key presenting process, the key information corresponding with a collation result is presented to the user. Each of the above steps can be performed at an independent timing.

Details of the processes indicated at each step in FIG. 2 will be described. First, the key receiving process at Step S201 will be described. FIG. 3 is a flowchart of an overall flow of the key receiving process according to the first embodiment.

First, the key receiving unit 221 receives the key information from the video-image recording/reproducing device 100 (Step S301). The key receiving unit 221 stores the received key information in the key storing unit 251 (Step S302). Next, the retrieving unit 222 references the content identification information included in the key information and retrieves the content relating to the key information from the information storing unit 252 (Step S303). For example, the retrieving unit 222 retrieves the video image information having the identification information or the broadcasting date matching the content within the key information. For example, even if the broadcasting date does not match, the retrieving unit 222 retrieves the video image information as a related content if the identification information matches.

The retrieving unit 222 can select the content relating to the received information from arbitrarily retrieved information, instead of retrieving the content by referencing the content identification information or the like.

Next, the retrieving unit 222 judges whether the related content is present (Step S304). If the related content is present (Step S304: YES), the retrieving unit 222 retrieves the related content from the information storing unit 252 (Step S305). When the related content is not present (Step S304: NO), the retrieving unit 222 retrieves the related content from an external device, such as another digital device (Step S306).

Figure 4:
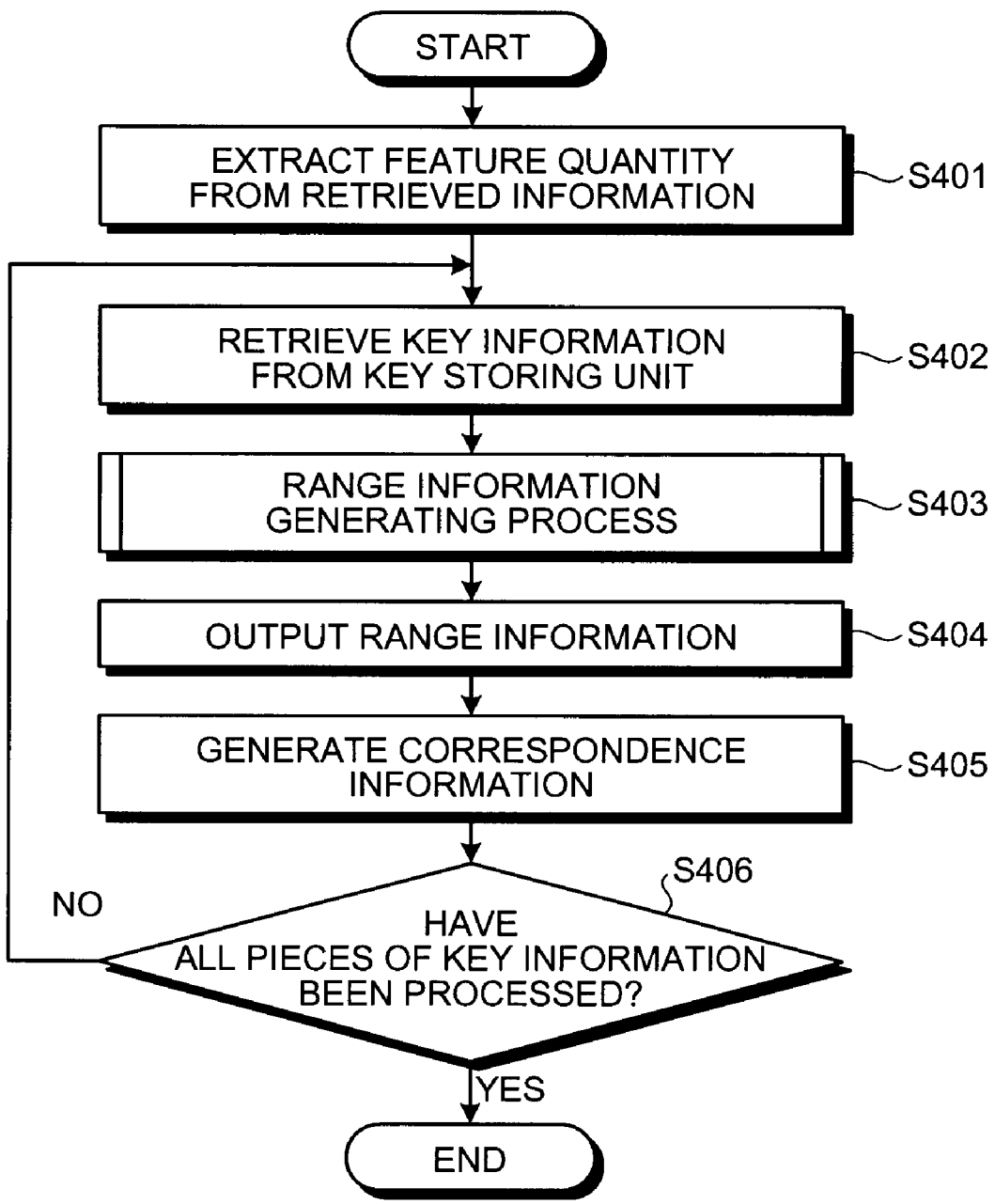
FIG. 4 is a flowchart of an overall flow of a key collating process according to the first embodiment.

Next, the key collating process at Step S202 will be described. FIG. 4 is a flowchart of an overall flow of the key collating process according to the first embodiment.

First, the extracting unit 223 extracts the feature quantity data from the content retrieved at Step S305 to Step S306 of the key receiving process (Step S401). The extracting unit 223 uses information within a predetermined range of some or all pieces of retrieved information as the content from which the feature quantity data is extracted (subject content). A feature quantity data extracting process is performed in frame units. A frame is a period of about 16 milliseconds for audio data and about 30 still images per second for video image data. For each frame, audio information of a wide range, including previous and subsequent audio information, and image information of a plurality of frames can be used to extract the feature quantity data.

Next, the detecting unit 224 retrieves one piece of key information from the key storing unit 251 (Step S402). Then, the detecting unit 224 collates the feature quantity data extracted at Step S401 and the feature quantity data included in the key information retrieved at Step S402. The detecting unit 224 performs a range information generating process in which the range information is generated (Step S403). The range information indicates the range from which the feature quantity matching the feature quantity data within the key information is extracted. Details of the range information generating process will be described hereafter.

Next, the detecting unit 224 outputs the range information generated in the range information generating process to the correspondence generating unit 225 (Step S404). Then, the correspondence generating unit 225 retrieves the video image and audio data of the section corresponding with the outputted range information. The correspondence generating unit 225 generates the correspondence information in which the retrieved video image and audio data and the key information used in the collation are corresponded (Step S405).

Next, the detecting unit 224 judges whether all pieces of key information have been processed (Step S406). When all pieces of key information have not been processed (Step S406: NO), the detecting unit 224 retrieves the next piece of key information and repeats the process (S402). When all pieces of key information have been processed (Step S406: YES), the key collating process is completed.

Each step of the process described above can be performed after all pieces of video image and audio data are retrieved. Alternatively, the video image and audio data can be retrieved in short processing units (frames), and the processes of each step can be successively performed. Correspondence information generation (Step S405) can be performed as required during the key presenting process, described hereafter, instead of being uniformly performed during the key collating process.

Figure 5:
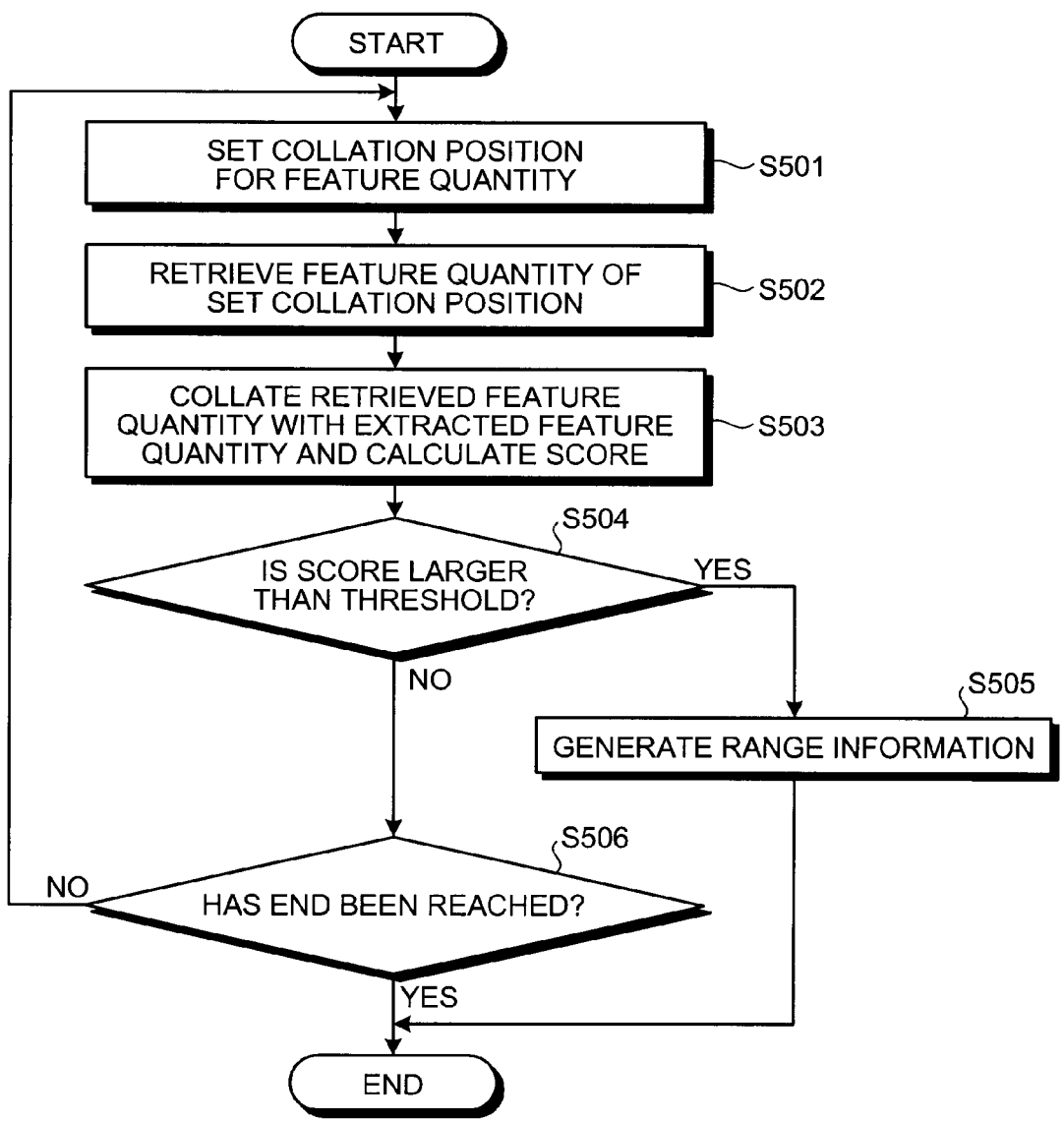
FIG. 5 is a flowchart of an overall flow of a range information generating process according to the first embodiment.

Next, the details of the range information generating process at Step S403 will be described. FIG. 5 is a flowchart of an overall flow of the range information generating process according to the first embodiment.

First, the detecting unit 224 sets a collation position of the feature quantity data within the retrieved key information (Step S501). The collation position is sequentially set from a head of the retrieval key (complete retrieval). For example, frames of the retrieval key, starting with a first frame, are sequentially collated with a tenth frame of the subject content. With reference to a collation history, the collating process can be performed by omission of positions of a previously processed frame at which a score was poor (pruning). The collation history is results of the collating process. For example, when the score of the collation between a fifth frame to a ninth frame of the subject content and a first frame to a fifth frame of the retrieval key is poor, a sixth frame of the retrieval key is excluded in the collation with a tenth frame of the subject content. To more efficiently perform the retrieval, settings including positions on a subject video image and audio data side can be made dynamically, depending on the collation history.

Next, the detecting unit 224 retrieves the feature quantity data of the set collation position (Step S502). Subsequently, the detecting unit 224 collates the feature quantity data extracted at Step S401 and the feature quantity data retrieved at Step S502. The detecting unit 224 calculates the score indicating a degree of coincidence of both pieces of feature quantity data (Step S503).

Any conventionally used method can be applied as a calculation method for the score, depending on types of feature quantity data to be used.

Next, the detecting unit 224 judges whether the calculated score is larger than a predetermined threshold value (Step S504). When the score is larger than the threshold value (Step S504: YES), the detecting unit 224 generates the range information indicating the range of the frame from which the feature quantity data has been extracted at Step S401 (Step S505). The range information generating process is completed.

When the score is smaller than the threshold value (Step S504: NO), the detecting unit 224 judges whether the collation position has reached an end of the feature quantity data (Step S506). When the end has not been reached (Step S506: NO), the detecting unit 224 sets a next collation position and repeats the process (Step S501). When the end has been reached (Step S506: YES), the range information generating process is completed.

A method for judging the score is not limited to the method described above. For example, scores obtained when the collation position is shifted and collation is performed can be accumulated. The detecting unit 224 can judge whether the accumulated scores are larger than the threshold value. In this case, the process is basically performed until the end of the key has been reached. A condition for judgment completion is that that a score condition is met. However, for example, if the score is better when the collation is terminated before the end of the key, the score obtained without reaching the end of the key can be used as the result and outputted. Only a section having the best score within a range of a predetermined proximity, among a plurality of sections in which the score condition is met, can also be outputted.

Figure 6:
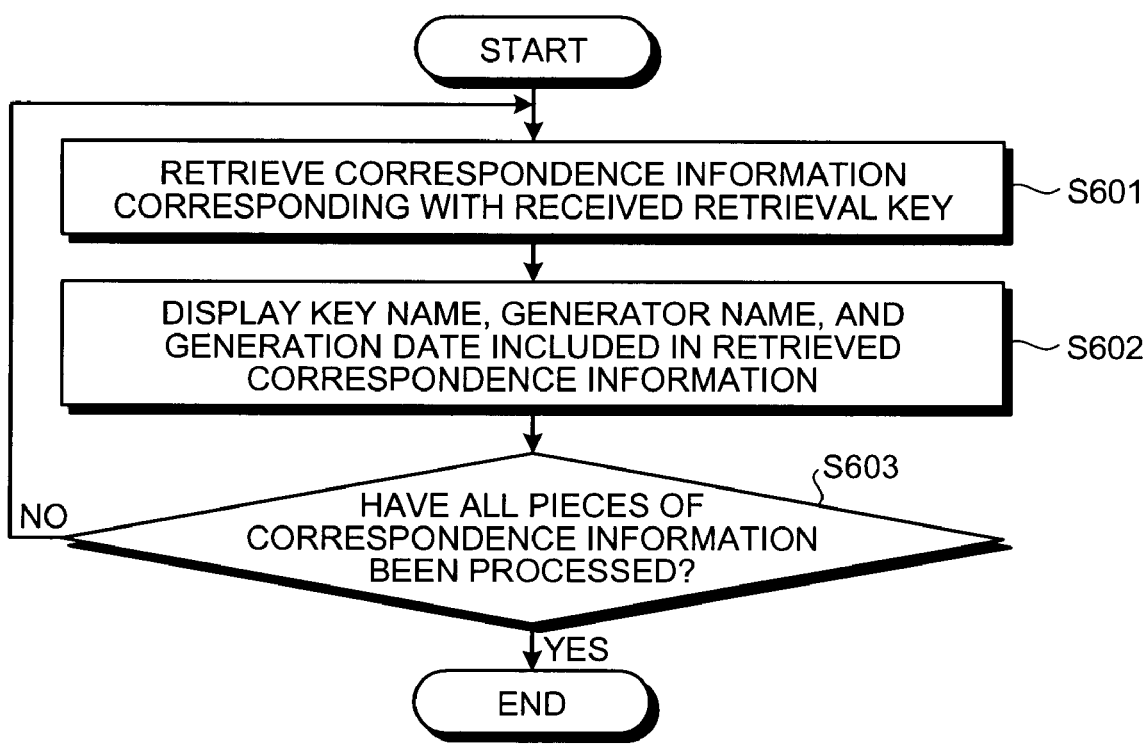
FIG. 6 is a flowchart of an overall flow of a key displaying process according to the first embodiment.

Next, the key presenting process at Step S203 will be described. FIG. 6 is a flowchart of an overall flow of the key presenting process according to the first embodiment.

First, the presenting unit 226 retrieves the corresponding information generated in the key collating process, in correspondence with the retrieval key received in the key receiving process (Step S601). Next, the presenting unit 226 displays the content identification information on the display screen (Step S602). The content identification information is, for example, a key name, a generator name, and a generation date included in the retrieved corresponding information.

FIG. 7 is an explanatory diagram showing an example of the display screen displayed by the presenting unit 226. A display screen 701 displays the information relating to the received retrieval key in a list format. FIG. 7 shows an example of a screen displaying only newly received retrieval keys (new arrival keys). The display screen 701 displays the name of the retrieval key (key name), the program name (or title name), the chapter name, the broadcasting date, the generator, the generation date, comments, and the like included in the key information, for each retrieval key.

A retrieval key 702 displayed at the top indicates that the retrieval key 702 has been selected by the user. A key generator comment is displayed only for the selected key due to display space constraints. A musical note mark on a right end indicates that the correspondence information has been generated. When the retrieval key is selected, the audio data corresponding with the retrieval key is reproduced with reference to the correspondence information.

At the same time, the retrieval key at the bottom applies to a "sports news" category program, rather than a specific program. The program that is the source of the retrieval key and the broadcasting date are not shown. No musical note mark is present on the right end, indicating that the correspondence information has not been generated because, for example, the related audio data is not yet retrieved. Therefore, the audio data cannot be reproduced even when the retrieval key at the bottom is selected.

Returning to FIG. 6, the presenting unit 226 judges whether all pieces of correspondence information have been processed (Step S603). When all pieces of correspondence information have not been processed (Step S603: NO), the presenting unit 226 retrieves the correspondence information corresponding with a next retrieval key and repeats the process (Step S601). When all pieces of correspondence information have been processed (Step S603: YES), the key presenting process is completed.

In this way, according to the first embodiment, the video-image recording/reproducing device 200 can receive the key information from the video-image recording/reproducing device 100. The video-image recording/reproducing device 100 is the other information processing apparatus. The key information includes only the retrieval key and does not include the video image and audio data or the like that is the source of the retrieval key. The video-image recording/reproducing device 200 can retrieve the video image and audio data or the like that is the source of the retrieval key within the video-image recording/reproducing device 200 itself, correspond the retrieved data with the retrieval key, and display the data.

In the above description, the key information is received from the video-image recording/reproducing device 100, via the network 300. However, the key information can instead be received and transmitted using a removable recording medium shared between the video-image recording/reproducing device 200 and the video-image recording/reproducing device 100.

In this case, the key generating unit 103 of the video-image recording/reproducing device 100 records the generated key information in the recording medium. The recording medium in which the key information is recorded can be removed from the video-image recording/reproducing device 100 by the user and attached to the video-image recording/reproducing device 200 to allow the video-image recording/reproducing device 200 to read the key information.

Furthermore, in this case, the video-image recording/reproducing device 200 includes a key information reading unit (not shown) in place of the key receiving unit 221. The key information reading unit reads the key information from the recording medium. For example, a small semiconductor memory card using a flash memory is used. All other storing media used for data exchange and distribution can be used, such as an easily-removable hard disk device, and writable compact disc (CD) and DVD media.

In the above description, the video image and audio data or the video image and audio signals are recorded in advance in the information storing unit 151. However, the video image and audio data inputted from the external digital video camera, the external digital microphone, the external reception tuner for digital broadcasts and the like, or the other external digital devices can be retrieved and recorded in the information storing unit 151. In addition, the retrieved video image and audio data can be sent to the designation receiving unit 102.

After the analog video image and audio signals are retrieved from the external video camera, the external microphone, the external broadcast reception tuner, or the other external devices and the analog video image and audio signals are converted to the digital video image and audio data, the digital video image and audio data can be recorded in the information storing unit 151 and sent to the designation receiving unit 102. In addition to these processes, the decryption process, the decoding process, the format converting process, the rate (compression rate) converting process, and the like can be performed on the video image and audio data, as required. Furthermore, the video image and audio data recorded in an external server can be retrieved via the network 300.

The retrieving unit 222 can retrieve the video image and audio data by reading the video image and audio data and the analog video image and audio signals recorded in the recording medium in advance. The retrieving unit 222 can also retrieve the video image and audio data recorded in the external server via the network 300. In this case as well, the retrieving unit 222 can select and retrieve the video image and audio data by referencing the program/title name and the broadcasting date included in the key information.

The video-image recording/reproducing device 100 and the video-image recording/reproducing device 200 are described as devices that operate while being connected one-to-one, via the network 300. However, a number of connected devices are not limited thereto. For example, the video-image recording/reproducing device 100 can transmit the key information to a plurality of connectable video-image recording/reproducing devices 200, via the network 300. Similarly, the video-image recording/reproducing device 200 can receive the key information from a plurality of video-image recording/reproducing devices 100. In this case, a number of communication partners can be an unspecified number. Alternatively, the communication partners can be a specified device group including devices selected in advance.

The video-image recording/reproducing device 200 can include same constituent elements as the video-image recording/reproducing device 100 and can be allowed to generate keys. In this case, the presenting unit 226 can display retrieval keys generated by the video-image recording/reproducing device 200 itself, in addition to the received retrieval keys. However, the content that is the source of the retrieval key generated by the video-image recording/reproducing device 200 itself is stored in the video-image recording/reproducing device 200. Therefore, the correspondence information used to for display can be generated without the key collating process being performed, if the information of the section designated as the retrieval key is present. In this case, there is a large amount of common functions between the retrieving unit 222 and the retrieving unit 101. Therefore, an overall configuration can be simplified through an integration of the retrieving unit 222 and the retrieving unit 101 to allow switching of operation modes. The same applies to the information storing unit 252 and the information storing unit 151.

In this way, the information processing apparatus according to the first embodiment can receive the retrieval key generated by the other information processing apparatus. The information processing apparatus can retrieve the related information using the feature quantity data included in the received retrieval key. The information processing apparatus can associate the related information with the retrieval key and present the information. Therefore, the information processing apparatus can present the video image information and the audio information retrieved within the information processing apparatus itself, without receiving the video images and audio corresponding with the retrieval key provided by the other information processing apparatus.

When merely temporal information of the key section within the content is provided, the information cannot be applied to a video image of a different episode of the same program or the like if a receiving end does not hold the same content. In other words, the retrieval key cannot be selected appropriately even when the video image of the key section applied to a video image of a different episode is viewed. On the other hand, the information processing apparatus according to the first embodiment can extract the video image corresponding to the key section even when the image is that of a different episode by collating the feature quantities. Therefore, the retrieval key received from the other information processing apparatus can be effectively used.

An information processing apparatus according to a second embodiment receives key-related information in addition to the retrieval key. The key-related information is related to information that is the extraction source of the feature quantity included in the retrieval key. The information processing apparatus retrieves information by referencing the key-related information. Through selection of the retrieved retrieval keys, the information processing apparatus can further retrieve related information. Furthermore, the information processing apparatus can attach metadata to the retrieved information, in adherence to metadata attaching regulations included in the key-related information.

Figure 8:
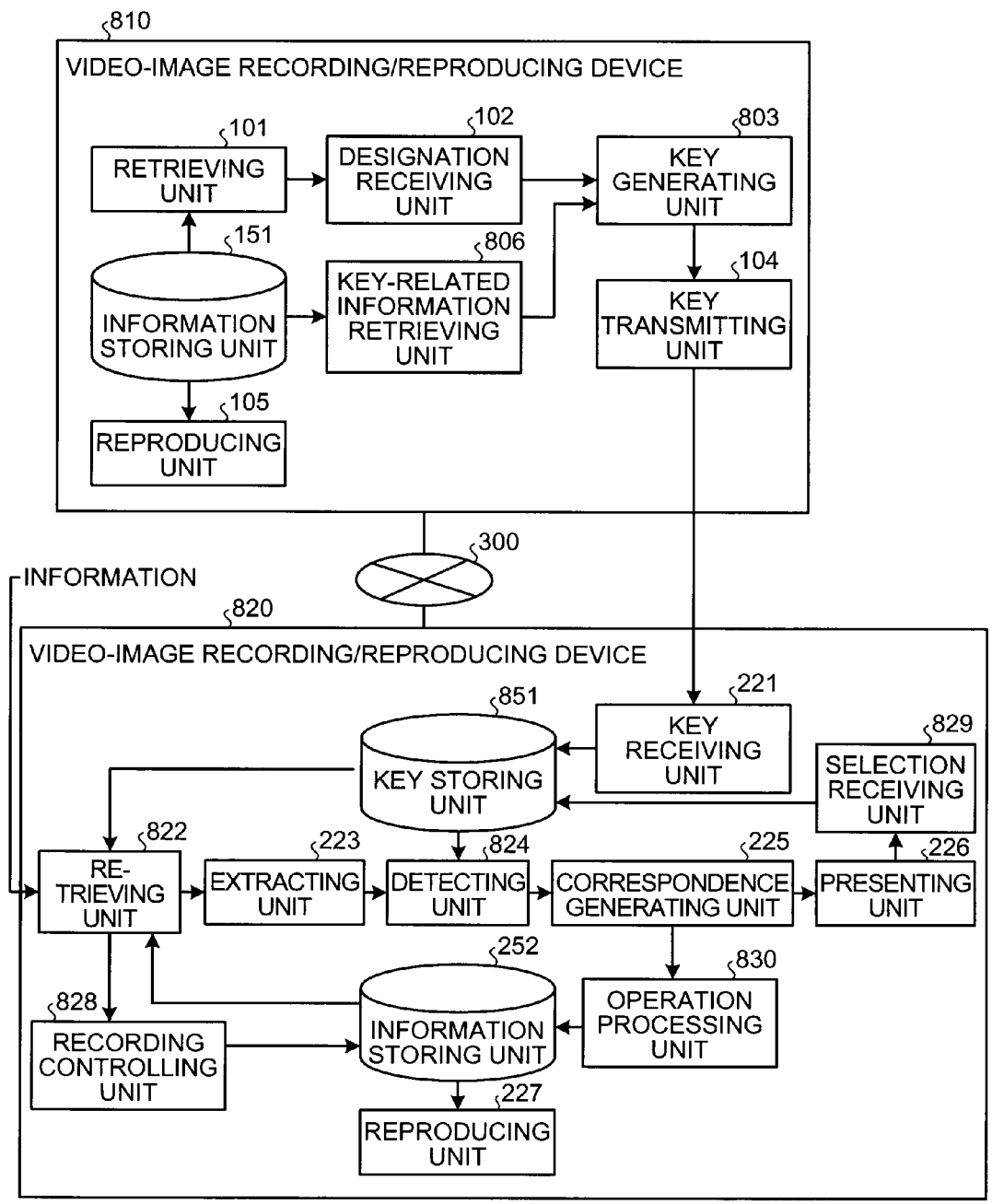
FIG. 8 is a block diagram showing a configuration of an information processing system according to a second embodiment.

FIG. 8 is a block diagram showing a configuration of an information processing system including a video-image recording/reproducing device 820 and a video-image recording/reproducing device 810 according to the second embodiment. The video-image recording/reproducing device 810 is the other information processing apparatus.

The video-image recording/reproducing device 810 includes the information storing unit 151, the retrieving unit 101, the designation receiving unit 102, a key generating unit 803, the key transmitting unit 104, the reproducing unit 105, and a key-related information retrieving unit 806.

The second embodiment differs from the first embodiment in that the key-related information retrieving unit 806 is added. Functions of the key generating unit 803 according to the second embodiment differ from those of the key generating unit 103 according to the first embodiment. Other configurations and functions are the same as those in FIG. 1. Therefore, the same configurations and functions are given the same reference numerals. Explanations thereof are omitted.

The key-related information retrieving unit 806 retrieves the key-related information from the information storing unit 151. The key-related information is related to a section of the video image and audio data of which designation has been received by the designation receiving unit 102. For example, when the title name corresponding to the designated video image and audio data or the chapter name corresponding to the designated section is stored in the information storing unit 151 as the content identification information, the key-related information retrieving unit 806 retrieves the content identification information as the key-related information.

When program attribute information can be retrieved using the EPG or the like, the key-related information retrieving unit 806 also retrieves the program attribute information as the key-related information. The program attribute information is, for example, the program ID, the program name (title, group, series, or derivation), the category, the broadcasting station (channel), and the broadcasting date (date, time, or day of the week), corresponding with the designated video image and audio data.

Furthermore, even when information does not directly correspond with the designated section, the key-related information retrieving unit 806 retrieves a neighboring chapter or marker and extracts the information of the retrieved chapter or marker. The key-related information retrieving unit 806 retrieves information indicating a positional relationship between the designated section and the chapter or the marker as the key-related information.

The key generating unit 803 generates the key information including the key-related information retrieved by the key-related information retrieving unit 806, in addition to the generated feature quantity data.

The video-image recording/reproducing device 820 includes a key storing unit 851, the information storing unit 252, the key receiving unit 221, the retrieving unit 222, the extracting unit 223, a detecting unit 824, the correspondence generating unit 225, the presenting unit 226, the reproducing unit 227, a recording controlling unit 828, a selection receiving unit 829, and an operation processing unit 830.

The second embodiment differs from the first embodiment in that the recording controlling unit 828, the selection receiving unit 829, and the operation processing unit 830 are added. A storing method of the key storing unit 851 and the functions of the retrieving unit 822 and the detecting unit 824 according to the second embodiment also differ from those of the key storing unit 251, the retrieving unit 222, and the detecting unit 224 according to the first embodiment. Other configurations and functions are the same as those in FIG. 1. Therefore, the same configurations and functions are given the same reference numerals. Explanations thereof are omitted.

The second embodiment differs from the first embodiment in that a following process (related content retrieving process) is added. In the related content retrieving process, after the retrieval keys are received and the retrieval keys are presented, related contents are further retrieved by a retrieval key selected by the user from among the presented retrieval keys. The key receiving unit 221, the key storing unit 851, the retrieving unit 822, the extracting unit 223, the detecting unit 824, the correspondence generating unit 225, and the presenting unit 226 are constituent elements of the key receiving process, the key collating process, and the key presenting process. The selection receiving unit 829, the key storing unit 851, the retrieving unit 822, the extracting unit 223, the detecting unit 824, the correspondence generating unit 225, and the operation processing unit 830 are constituent elements of the related content retrieving process. The information storing unit 252 and the recording controlling unit 828 are common constituent elements of these processes.

The key storing unit 851 stores the key information received by the key receiving unit 221. The key storing unit 851 according to the second embodiment differs from the key storing unit 251 according to the first embodiment in that the information indicating selection by the selection receiving unit 829 is correlated with respective key information and stored.

The retrieving unit 822 according to the second embodiment differs from the retrieving unit 222 according to the first embodiment in that the retrieving unit 822 performs a following process. When the related content cannot be retrieved by referencing the key-related information, the retrieving unit 822 makes a recording reservation using the recording controlling unit 828, described hereafter, and retrieves the content on the designated broadcasting date.

In other words, the retrieving unit 822 retrieves a related program of the same program (a re-run or another episode) or the like using the EPG, by, for example, matching or partial matching of the program attribute information, such as the program name, or association using the program attribute information. When a program is to be broadcasted, the retrieving unit 822 makes the recording reservation using the recording controlling unit 828.

The detecting unit 824 differs from the detecting unit 224 according to the first embodiment in that a following process is added. From the video image and audio data retrieved at an arbitrary timing, the detecting unit 824 detects the range information matching the feature quantity data of the key information selected by the selection receiving unit 829, described hereafter.

The recording controlling unit 828 controls the acquisition of the video image and audio data performed by the retrieving unit 822 and the recording of the video image and audio data retrieved by the retrieving unit 822 in the information storing unit 252. For example, the recording controlling unit 828 controls a process in which the recording reservation is made to the information storing unit 252, under an instruction from the retrieving unit 822. When the reservation date arrives, the recording controlling unit 828 retrieves the information via the retrieving unit 822 and records the retrieved information in the information storing unit 252.

The selection receiving unit 829 receives the key information corresponding with the retrieval key selected by the user from among the retrieval keys displayed in the presenting unit 226.

The operation processing unit 830 performs a following process. The operation processing unit 830 references recording operation attributes included in the key-related information and generates a chapter or a marker in the video image and audio data recorded in the information storing unit 252. The operation processing unit 830 also attaches information such as a chapter name or a marker name. The operation processing unit 830 can store the metadata in an XML database or the like. Details of the recording operation attributes will be described hereafter. When the video image and audio data retrieved by the retrieving unit 822 are displayed on the screen, the operation processing unit 830 can display the information, such as the chapter name and the marker name, on the screen.

In the above description, the received key information and the key information of which the selection has been received by the selection receiving unit 829 are both stored in the key storing unit 851. However, the key information can be respectively stored in separate storing units. In this case, regarding the key information of which the selection has been received by the selection receiving unit 829, only information identifying the key information stored in the key storing unit 851 can be stored, rather than the actual key information. In addition, a storing unit to which the key information is transferred from the key storing unit 851 and stored, without the selection being received by the selection receiving unit 829, can be provided.

Figure 9:
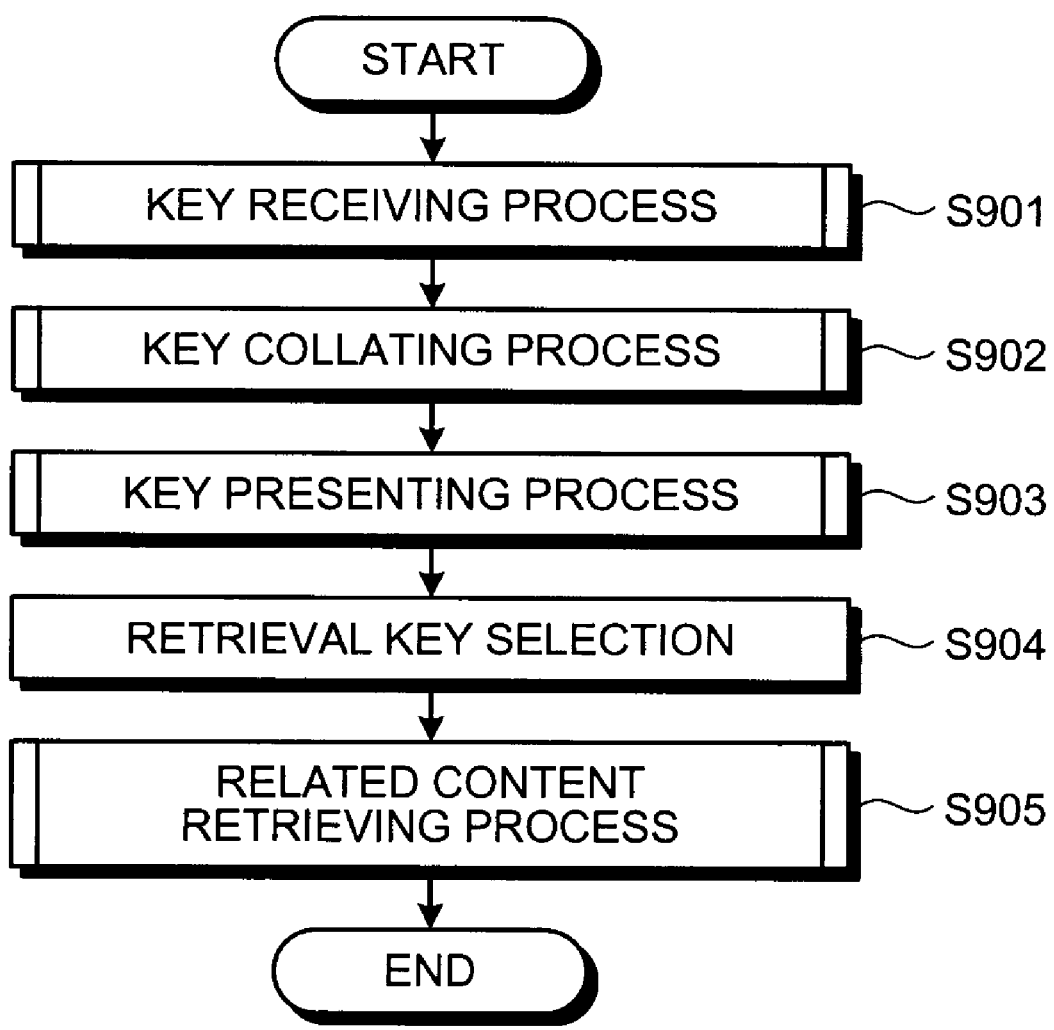
FIG. 9 is a flowchart of an overall flow of an information processing according to the second embodiment.

Next, information processing performed by the video-image recording/reproducing device 820 according to the second embodiment, configured as such, will be described. FIG. 9 is a flowchart of an overall flow of the information processing according to the second embodiment.

First, the key receiving process is performed (Step S901). In the key receiving process, the key information is received and the related information is retrieved. Details of the key receiving process will be described hereafter.

Next, the key collating process (Step S902) and the key presenting process (Step S903) are performed. Details of the key collating process and the key presenting process are the same as the processes at Step S202 and Step S203 performed by the video-image recording/reproducing device 200 according to the first embodiment. Explanations thereof are omitted. The display screen displayed in the key presenting process can be a different type from that according to the first embodiment.

Figure 10:
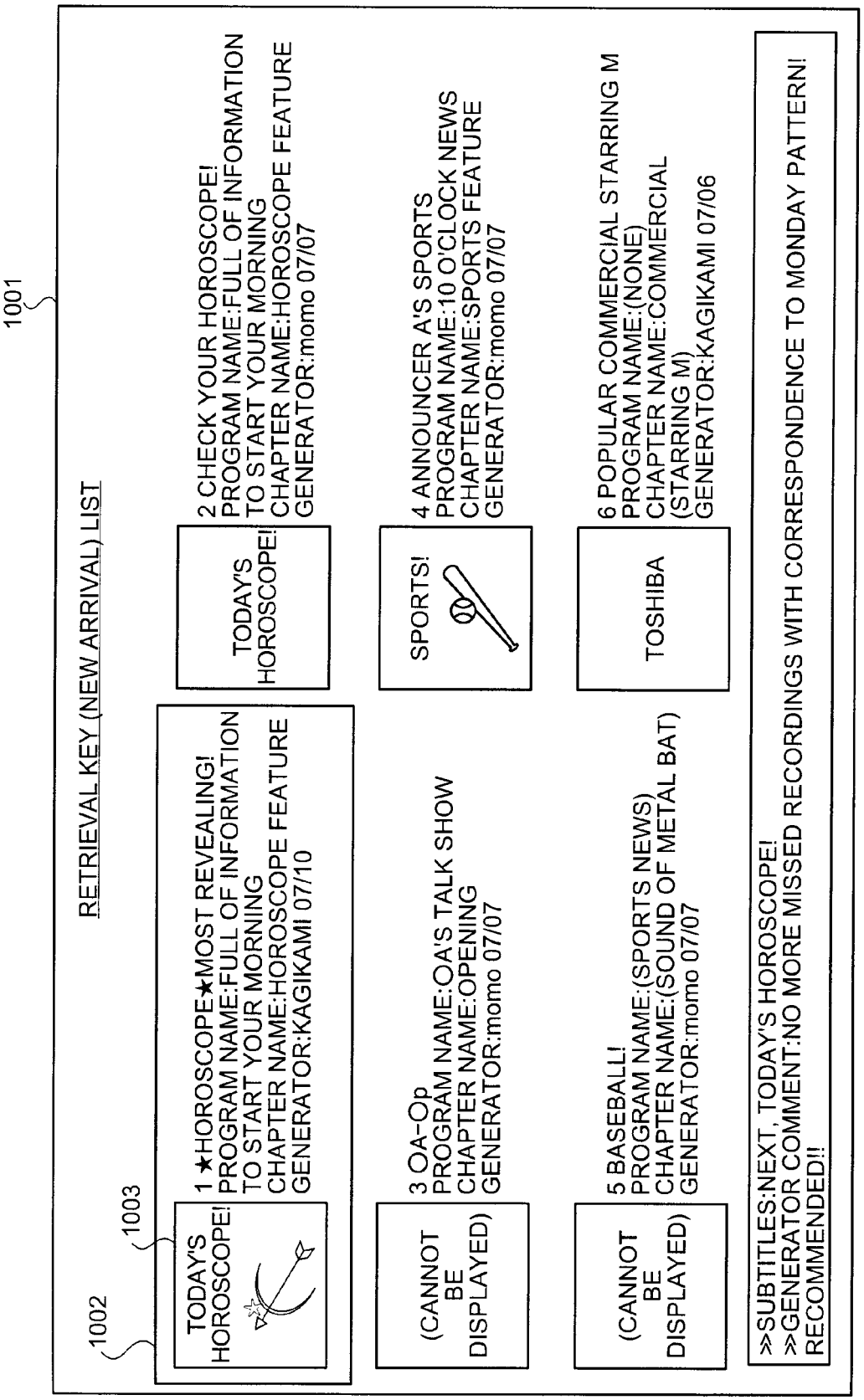
FIG. 10 is an explanatory diagram showing another example of the display screen.

FIG. 10 is an explanatory diagram showing another example of the display screen displayed by the presenting unit 226. The new arrival keys are displayed in a list. On a display screen 1001, the name of the retrieval key, the program/title name, the chapter name, the generator name, the generation date, comments, and the like included in the key information are displayed for each retrieval key. Furthermore, the presenting unit 226 generates thumbnails (still images) from the video image and audio data corresponding to the retrieval keys by referencing the correspondence information of the retrieval keys, and displays a thumbnail display column.

The thumbnails are preferably generated from the video image and audio data of the section corresponding with the retrieval key. However, the thumbnails can be displayed using thumbnails generated in advance for the corresponding video image and audio data, unrelated to the retrieval key. Text of subtitle data or a keyword selected from the text corresponding with the video image and audio data of the section corresponding with the retrieval key is displayed.

For example, in a retrieval key 1002 that is a first retrieval key, information such as the program name, "FULL OF INFORMATION TO START YOUR MORNING", the chapter name, "HOROSCOPE FEATURE", and the like are displayed in addition to the key name. A rectangle surrounding the retrieval key 1002 indicates that the retrieval key 1002 is selected by the user. Subtitle text and the key generator comment are displayed on the bottom of the screen for only the selected key, due to display space constraints. When the retrieval key is selected, the video image and audio data (moving image) of the section corresponding to the retrieval key is reproduced in a thumbnail display column 1003.

The retrieval key on the lower left applies to the "sports news" category program, rather than a specific program. The program that is the source of the retrieval key and the broadcasting date are not shown. In the retrieval keys in which "cannot be displayed" is displayed in the thumbnail display column, the correspondence information has not been generated because, for example, the related video image and audio data is not yet retrieved. Therefore, the thumbnail or the subtitle data cannot be displayed, nor can the video image and audio data be reproduced.

Returning to FIG. 9, after the key presenting process at Step S903, according to the second embodiment, the selection receiving unit 829 receives the key information corresponding with the retrieval key selected by the user from among the presented retrieval keys (Step S904). Next, the related content retrieving process is performed. In the related content retrieving process, the content relating to the selected key information is retrieved (Step S905). Details of the related-content retrieving process will be described hereafter. Each of the above steps can be performed at an independent timing.

Figure 11:
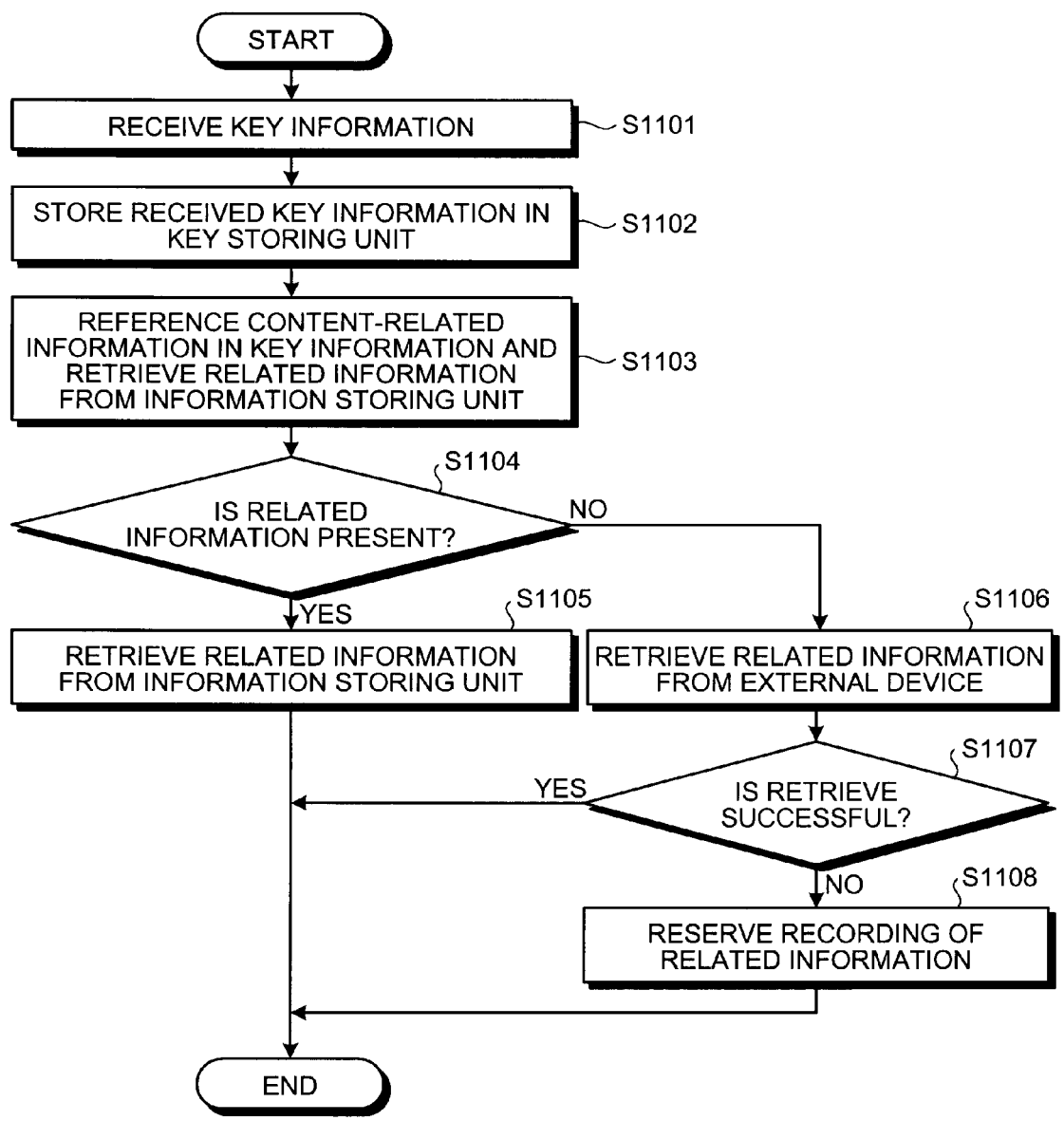
FIG. 11 is a flowchart of an overall flow of a key receiving process according to the second embodiment.

Next, the details of the key receiving process at Step S901 will be described. FIG. 11 is a flowchart of an overall flow of the key receiving process according to the second embodiment.

The key information receiving process and the related-content retrieving process from Step S1101 to Step S1106 are the same processes as those at Step S301 to Step S306 performed in the video-image recording/reproducing device 100 according to the first embodiment. Explanations thereof are omitted.

After the related content is retrieved from the external device at Step S1106, the retrieving unit 822 judges whether the acquisition is successful (Step S1107). When the acquisition is successful (Step S1107: YES), the key receiving process is completed. When the acquisition has failed (Step S1108: NO), the recording controlling unit 828 reserves the recording of the related content of which the acquisition has failed and completes the key receiving process (Step S1108). In other words, the retrieving unit 822 references the key-related information included in the received key information and makes the reservation for the recording using the recording controlling unit 828 to, for example, retrieve the program from the EPG and retrieve the information at the date. Subsequently, the retrieving unit 822 retrieves the information reserved at the designated date (not shown).

In this way, according to the second embodiment, broad information, such as the information that can be retrieved from the EPG, are received as the key-related information with the key information. The retrieving unit 822 references the key-related information and retrieves more suitable information.

Figure 12:
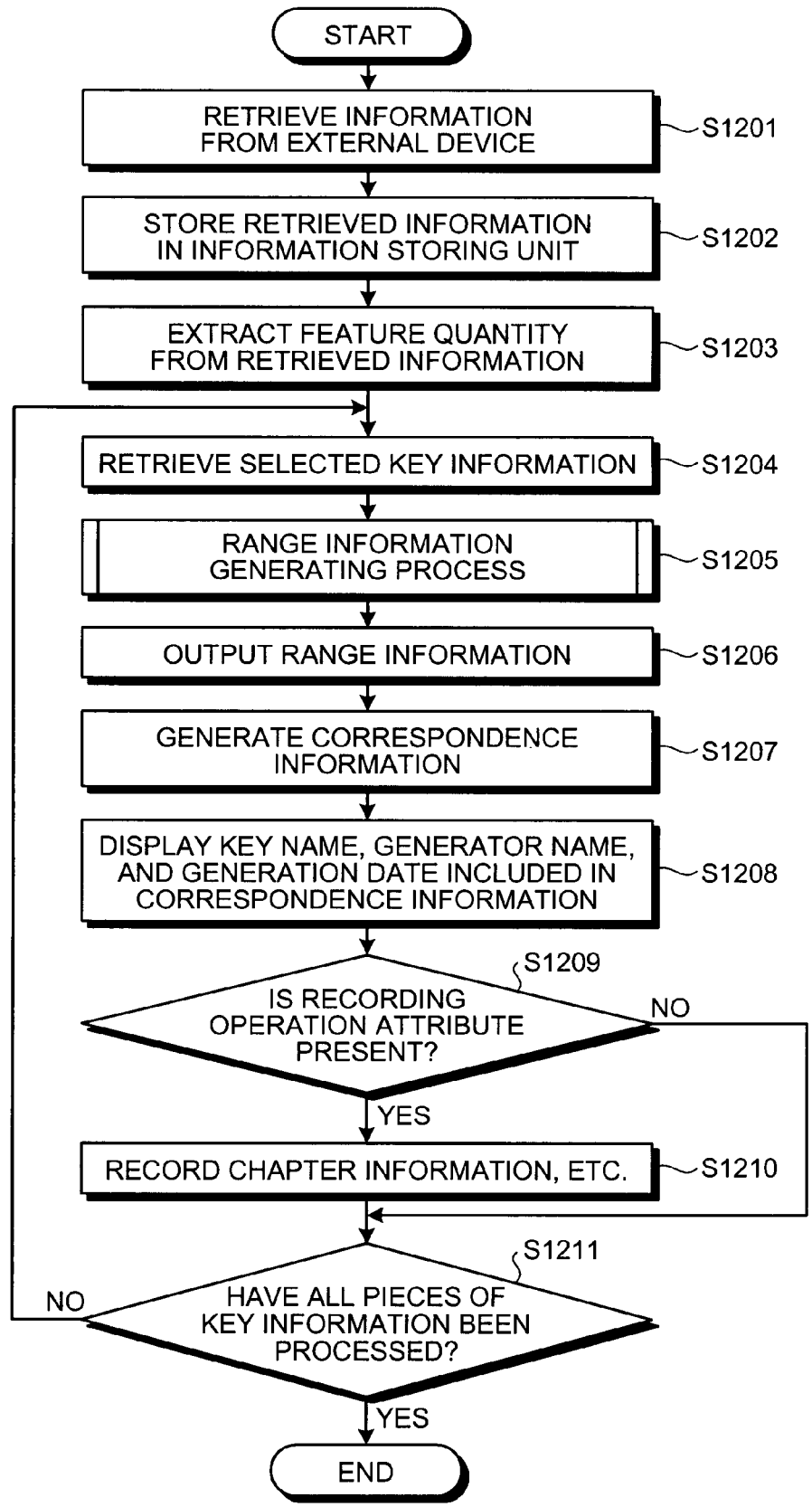
FIG. 12 is a flowchart of an overall flow of a related content retrieving process according to the second embodiment.

Next, the details of the related content retrieving process at Step S905 will be explained. FIG. 12 is a flowchart of an overall flow of the related-content retrieving process according to the second embodiment.

First, the retrieving unit 822 retrieves the content from the external device (Step S1201). Then, the retrieving unit 822 stores the retrieved content in the information storing unit 252 (Step S1202). The acquisition of the content by the retrieving unit 822 refers to the retrieving process performed at an arbitrary timing, such as an instruction from the user or a recording reservation.

Next, the extracting unit 223 extracts the feature quantity data from the retrieved content (Step S1203). Then, the detecting unit 824 retrieves the key information selected by the selection receiving unit 829 from the key storing unit 851 (Step S1204). At this time, the detecting unit 824 references the information indicating selection by the selection receiving unit 829 and retrieves only the key information selected by the selection receiving unit 829 from among the key information stored in the key storing unit 851. The detecting unit 824 also references the content identification information of the key information and retrieves only the key information that can be applied to the retrieved content (program).

The range information generating process, the range information outputting process, and the correspondence information generating process from Step S1205 to Step S1207 are the same as the processes at Step S403 to Step S405 performed by the video-image recording/reproducing device 200 according to the first embodiment. Explanations thereof are omitted.

Next, the presenting unit 226 displays the content identification information, such as the key name, the generator name, and the generation date, included in the correspondence information on the display screen (Step S1208).

At the same time, the operation processing unit 830 performs a process in which the operation processing unit 830 references the key-related information included in the correspondence information and attaches the chapter and the like. First, the operation processing unit 830 judges whether the recording operation attributes are included in the key-related information (Step S1209). When the recording operation attributes are included (Step S1209: YES), the operation processing unit 830 attaches the information of the chapter and the like to the information stored at Step S1202, according to the recording operation attributes and stores the information in the information storing unit 252 (Step S1210).

Figures 14, 15:
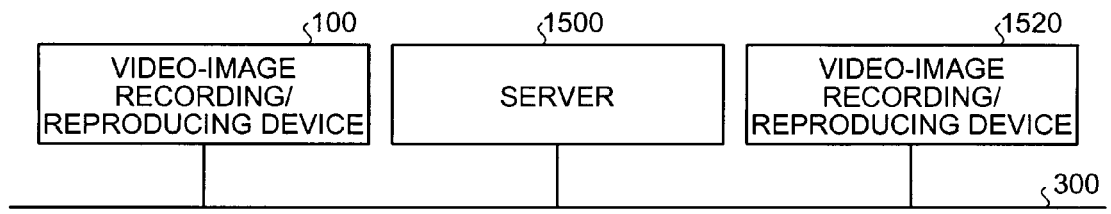
FIG. 14 is an explanatory diagram showing operations of each recording operation attribute.
FIG. 15 is a block diagram showing an overview of a configuration of an information processing system according to a third embodiment.

Details of the recording operation attributes will be described. FIG. 13 is an explanatory diagram showing an example of the key-related information including the recording operation attributes. FIG. 14 is an explanatory diagram showing an example of an operation content for each recording operation attribute.

As shown in FIG. 13, according to the second embodiment, the key-related information in which the retrieval key ID, the key name, the title name, the program category, and the recording operation attribute are corresponded can be correlated with the key information. The retrieval key ID identifies the retrieval key.

Regarding retrieval key ID=A, information, such as "HOROSCOPE FEATURE", "MORNING INFORMATION TELEVISION PROGRAM", "NEWS" and "INFORMATION/VARIETY", and "BGM ATTRIBUTE 1 (BGM-1)", is managed. Regarding retrieval key ID=B, information, such as "OPENING", "EVENING DRAMA SERIES", "DRAMA", and "OPENING MUSIC ATTRIBUTE 1 (OPM-1)", is managed. Regarding retrieval key ID=C, information, such as "SPORTS CORNER", "10 O'CLOCK NEWS", "NEWS" and "SPORTS NEWS", and "CORNER MUSIC ATTRIBUTE 1 (CNM-1)", is managed. Regarding retrieval key ID=D, information, such as "SWIMMING START SOUND", "(NO TITLE)", "NEWS" and "SPORTS", and "COMPETITION STARTING EVENT ATTRIBUTE 1 (SGE-1)", is managed. The BGM-1, the OPM-1, the CNM-1, the SGE-1, and the like are identifiers used to identify the recording operation attributes.

The title information is retrieved by the key-related information retrieving unit 806 of the video-image recording/reproducing device 810. The key name and the recording operation attribute are inputted or selected by the user using the inputting unit (not shown). In addition, information, such as parameters relating to the collation operation performed by the detecting unit 824, can be included.

The recording operation attributes shown in FIG. 14 are used in the recording operation performed by the operation processing unit 830, with reference to detection results from the detecting unit 824 in the video-image recording/reproducing device 820. The recording operation attributes are stored in the storing unit or the like (not shown) and are referenced by the operation processing unit 830.

The "BGM ATTRIBUTE 1 (BGM-1)" is added to the retrieval key for a recording operation in which a following setting is made. An entire detected section is the marker section. A name of the section is set to "(key name)" ("(key name)-number" when a plurality of sections are detected). "#" in the diagram indicates the number.

The "OPENING MUSIC ATTRIBUTE 1 (OPM-1)" is added to the retrieval key for a recording operation in which following settings are made. Chapter division is performed at a start and an end of the detected section. A name of the chapter between the start and the end is set to "'opening"-number'. A name of a latter chapter divided by the end is set to "'main chapter"-number'. If the title name is not yet set, the "title name" associated with the key is set as the title name.

The "CORNER MUSIC ATTRIBUTE 1 (CNM-1)" is added to the retrieval key for a recording operation in which following settings are made. The chapter division is performed at the start of the detected section. The name of a divided latter chapter is set to "(key name)" ("(key name)-number" when a plurality of sections are detected). If the title name is not yet set, the "title name" associated with the key is set as the title name.

The "COMPETITION STARTING EVENT ATTRIBUTE 1 (SGE-1)" is added to the retrieval key for a recording operation in which a following setting is made. A point two seconds before the start of the detected section is a marker point. The name of the marker is set to "(key name)-number".

When the key-related information such as that shown in FIG. 13 are added to the key information, the operation processing unit 830 references the identifier of the recording operation attribute and retrieves the operation content of the recording operation attribute from a table, such as that shown in FIG. 14. Then, the operation processing unit 830 attaches the metadata, such as the chapter and the marker, to the retrieved information, in adherence to the retrieved operation content, and stores the information in the information storing unit 252.

In this way, according to the second embodiment, the metadata, such as the chapter and the marker, can be generated in similar areas of the sound content or the video image content, depending on the key-related information included in the key information, and the recording operation can be performed.

Returning to FIG. 12, after the operation processing unit 830 records the information on the chapter or the like (Step S1210), the detecting unit 824 judges whether all pieces of key information have been processed (Step S1211). When all pieces of key information have not been processed (Step S1211: NO), the detecting unit 824 retrieves a next key information and repeats the process (Step S1204). When all pieces of key information have been processed (Step S1211: YES), the key collating process is completed.

As described above, the information processing apparatus according to the second embodiment can receive the key-related information with the retrieval key. The key-related information is related to the content that is the extraction source of the feature quantity included in the retrieval key. The information processing apparatus can reference the key-related information and retrieve the content. Therefore, the contents relating to the retrieval key can be retrieved more efficiently. As a result of the user selecting the retrieved retrieval key, the related information can be further retrieved. In addition, the metadata can be included in the retrieved data with reference to the key-related information including the metadata attaching regulations.

According to the first embodiment and the second embodiment, the retrieval keys transmitted from the other information processing apparatus are passively received. The information processing apparatus according to a third embodiment transmits a command requesting a transmission of the retrieval key to a server apparatus managing the retrieval keys transmitted by the other information processing apparatus. The information processing apparatus receives the retrieval key returned in response to the command.

FIG. 15 is a block diagram showing an overview of a configuration of an information processing system including a video-image recording/reproducing device 1520 and the video-image recording/reproducing device 100 according to the third embodiment. The video-image recording/reproducing device 100 is the other information processing apparatus. The third embodiment differs from the first embodiment and the second embodiment in that a server 1500 is included.

Figure 16:
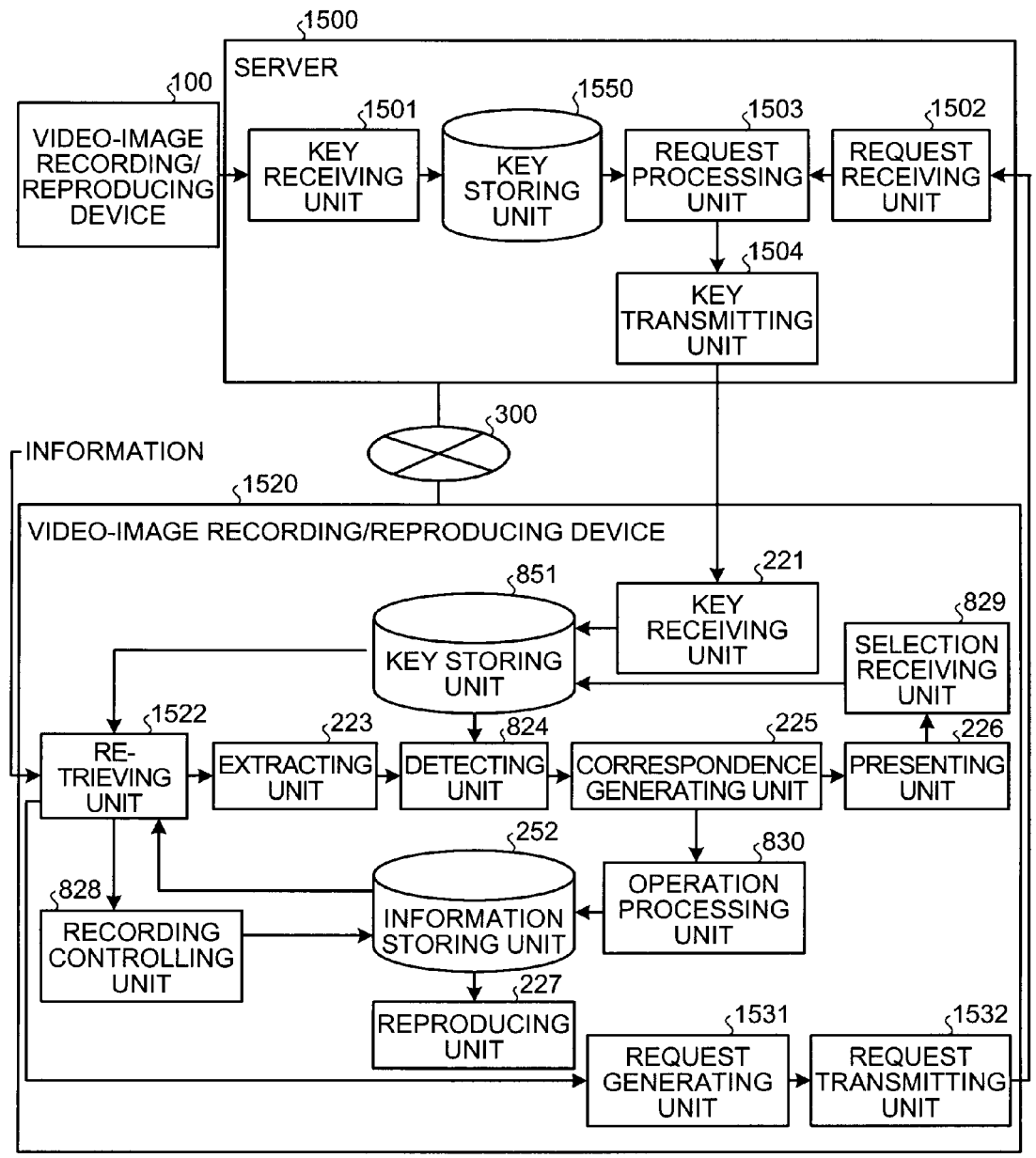
FIG. 16 is a block diagram showing details of a configuration of the information processing system according to the third embodiment.

FIG. 16 is a block diagram showing the details of the configuration of the information processing system including the video-image recording/reproducing device 1520 and the server 1500 according to the third embodiment. The server 1500 includes a key storing unit 1550, a key receiving unit 1501, a request receiving unit 1502, a request processing unit 1503, and a key transmitting unit 1504.

The key storing unit 1550 stores the key information received by the key receiving unit 1501, described hereafter. The key storing unit 1550 can include any commonly used storing medium, such as the HDD, the RAM, the optical disc, or the memory card.

The key receiving unit 1501 receives the key information transmitted from the video-image recording/reproducing device 100 and stores the key information in the key storing unit 1550. Only one video-image recording/reproducing device 100 is shown in the diagram. However, the number of devices is not limited to one. The key receiving unit 1501 receives the key information from a plurality of video-image recording/reproducing devices 100. Similarly, a plurality of video-image recording/reproducing devices 1520 can be connected.

The request receiving unit 1502 receives a request message requesting the transmission of the key information from the video-image recording/reproducing device 1520. Details of the request message will be described hereafter. The request message includes content identification information.

The request processing unit 1503 references the request message received by the request receiving unit 1502 and performs a process in which the corresponding key information is extracted from the key information stored in the key storing unit 1550. Specifically, the request processing unit 1503 collates the content identification information included in the request message and the content identification information included in the key information stored in the key information storing unit 1550. The request processing unit 1503 extracts the matching or related key information. For example, the request processing unit 1503 extracts the key information corresponding to a related program, such as the same program (different episode), through a match or a partial match between the key information and the program attribute information or through association with the program attribute information. The program attribute information is, for example, the program name.

The key transmitting unit 1504 transmits the key information extracted by the request processing unit 1503 to the video-image recording/reproducing device 1520, via the network 300.

The video-image recording/reproducing device 1520 includes the key storing unit 851, the information storing unit 252, the key receiving unit 221, an retrieving unit 1522, the extracting unit 223, the detecting unit 824, the correspondence generating unit 225, the presenting unit 226, the reproducing unit 227, the recording controlling unit 828, the selection receiving unit 829, the operation processing unit 830, a request generating unit 1531, and a request transmitting unit 1532.

The third embodiment differs from the second embodiment in that the request generating unit 1531 and the request transmitting unit 1532 are added. In addition, the function of the retrieving unit 1522 also differs from that of the retrieving unit 822 according to the second embodiment. Other configurations and functions are the same as those in FIG. 8. Therefore, the same configurations and functions are given the same reference numerals. Explanations thereof are omitted.

The retrieving unit 1522 differs from the retrieving unit 822 according to the second embodiment in that a following function is added. When the video image and audio data is retrieved, the retrieving unit 1522 requests that the request generating unit 1531 perform a process in to request the acquisition of the retrieval key relating to the retrieved video image and audio data.

The request generating unit 1531 generates a request message requesting the retrieval key related the video image and audio data retrieved by the retrieving unit 1522. Specifically, the request generating unit 1531 generates the request message including the content identification information corresponding with the retrieved video image and audio data. The content identification information is, for example, the program attribute information, such as the title name corresponding to the video image and audio data, the program ID retrieved using the EPG or the like, the program name (title, group, series, or derivation), the category, the broadcasting station (channel), the broadcasting date (date, time, or day of the week), apply. Temporal information for limiting some sections of the program can also be included.

The request transmitting unit 1532 transmits the request message generated by the request generating unit 1531 to the server 1500, via the network 300.

Figure 17:
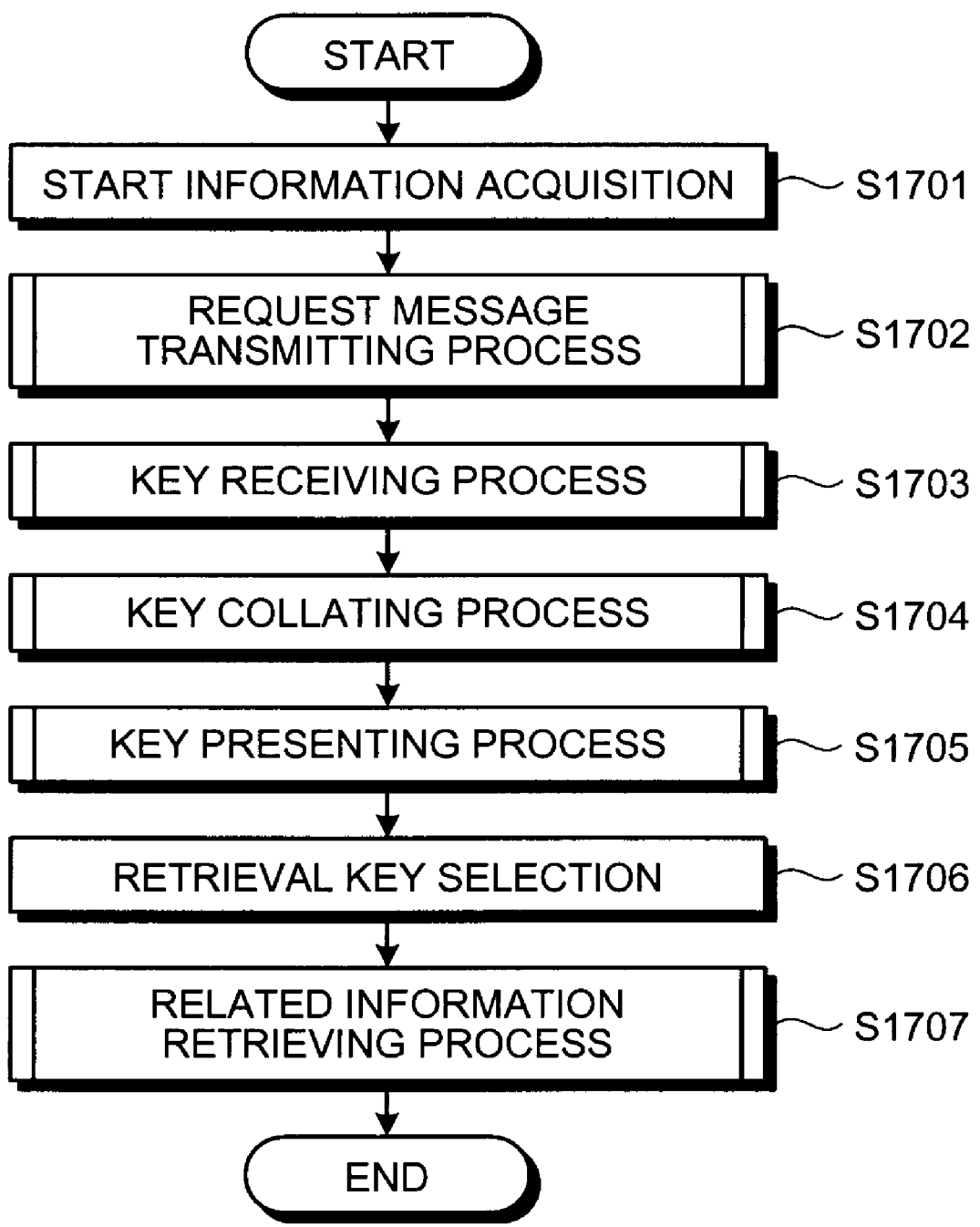
FIG. 17 is a flowchart of an overall flow of the information processing according to the third embodiment.

Next, an information processing performed by the video-image recording/reproducing device 1520 according to the third embodiment, configured as such, will be described. FIG. 17 is a flowchart of an overall flow of the information processing according to the third embodiment.

First, the retrieving unit 1522 starts retrieving information from the external device (Step S1701). The acquisition of the information performed by the retrieving unit 1522 refers to the retrieving process performed at an arbitrary timing, such as an instruction from the user or recording reservation. Next, a request message transmitting process is performed (Step S1702). In the request message transmitting process, the request message is generated and transmitted to the server 1500 (Step S1702). Details of the request message transmitting process will be described hereafter.

The processes at Step S1703 to Step S1707 are the same as the processes at Step S901 to Step S905 performed by the video-image recording/reproducing device 820. Explanations thereof are omitted.

Figure 18:
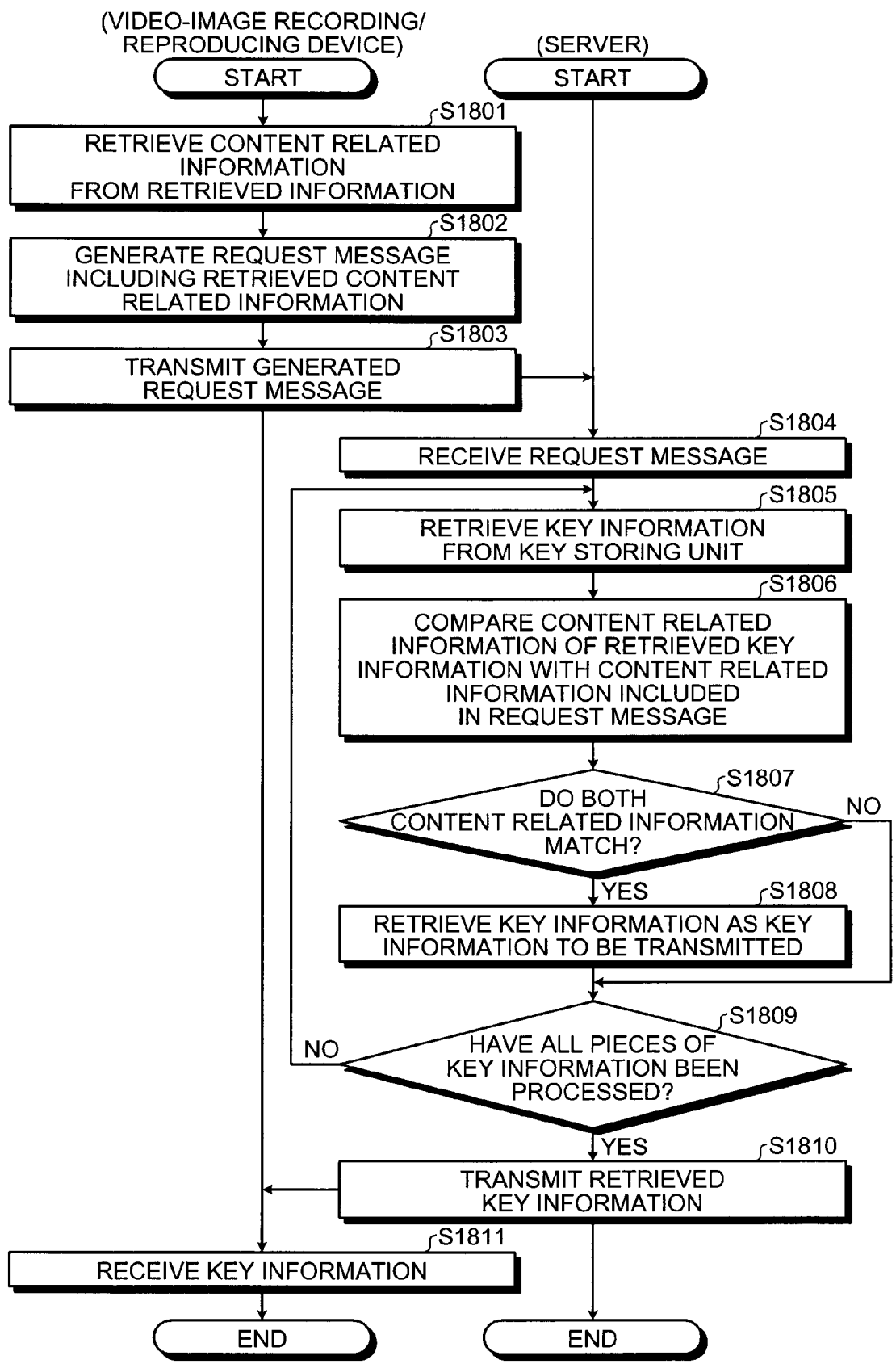
FIG. 18 is a flowchart of an overall flow of a request message transmitting process.

Next, details of the request message transmitting process at Step S1702 will be described. FIG. 18 is a flowchart of an overall flow of the request message transmitting process.

First, the request generating unit 1531 of the video-image recording/reproducing device 1520 retrieves the content identification information of the information retrieved by the retrieving unit 1522 (Step S1801). Next, the request generating unit 1531 generates the request message including the retrieved content identification information (Step S1802). Then, the request transmitting unit 1532 transmits the request message generated by the request generating unit 1531 to the server 1500 (Step S1803).

Next, the request receiving unit 1502 in the server 1500 receives the request message (Step S1804). Then, the request processing unit 1503 retrieves one piece of key information from the key storing unit 1550 (Step S1805).

Next, the request processing unit 1503 compares the content identification information of the retrieved key information and the content identification information included in the request message (Step S1806). The request processing unit 1503 judges whether both content identification information match (Step S1807).

When both content identification information match (Step S1807: YES), the request processing unit 1503 retrieves the key information as the key information to be transmitted and stores the key information in the RAM or the like (Step S1808).

When both content identification information do not match (Step S1807: NO) or after the key information is retrieved (Step S1808), the request processing unit 1503 judges whether all pieces of key information have been processed (Step S1809).

When all pieces of key information have not been processed (Step S1809: NO), the request processing unit 1503 retrieves the next key information and repeats the process (Step S1805). When all pieces of key information have been processed (Step S1809: YES), the key transmitting unit 1504 retrieves all pieces of key information retrieved at Step S1808 from the RAM or the like and transmits the retrieved key information to the video-image recording/reproducing device 1520 (Step S1810).

The key receiving unit 221 of the video-image recording/reproducing device 1520 receives the transmitted key information (Step S1811) and the request message transmitting process is completed.

According to the second embodiment, the retrieval key is passively received. However, according to the third embodiment, the retrieval key relating to the recorded video image and audio data can be requested and the key information corresponding with the related retrieval key can be actively received, in this way.

In the above description, the request message is processed by the server 1500 differing from the video-image recording/reproducing device 100. However, the request message can be processed by the video-image recording/reproducing device 100 and the corresponding key information can be transmitted from the video-image recording/reproducing device 100 to the video-image recording/reproducing device 1520, without the server 1500 being provided.

Figure 19:
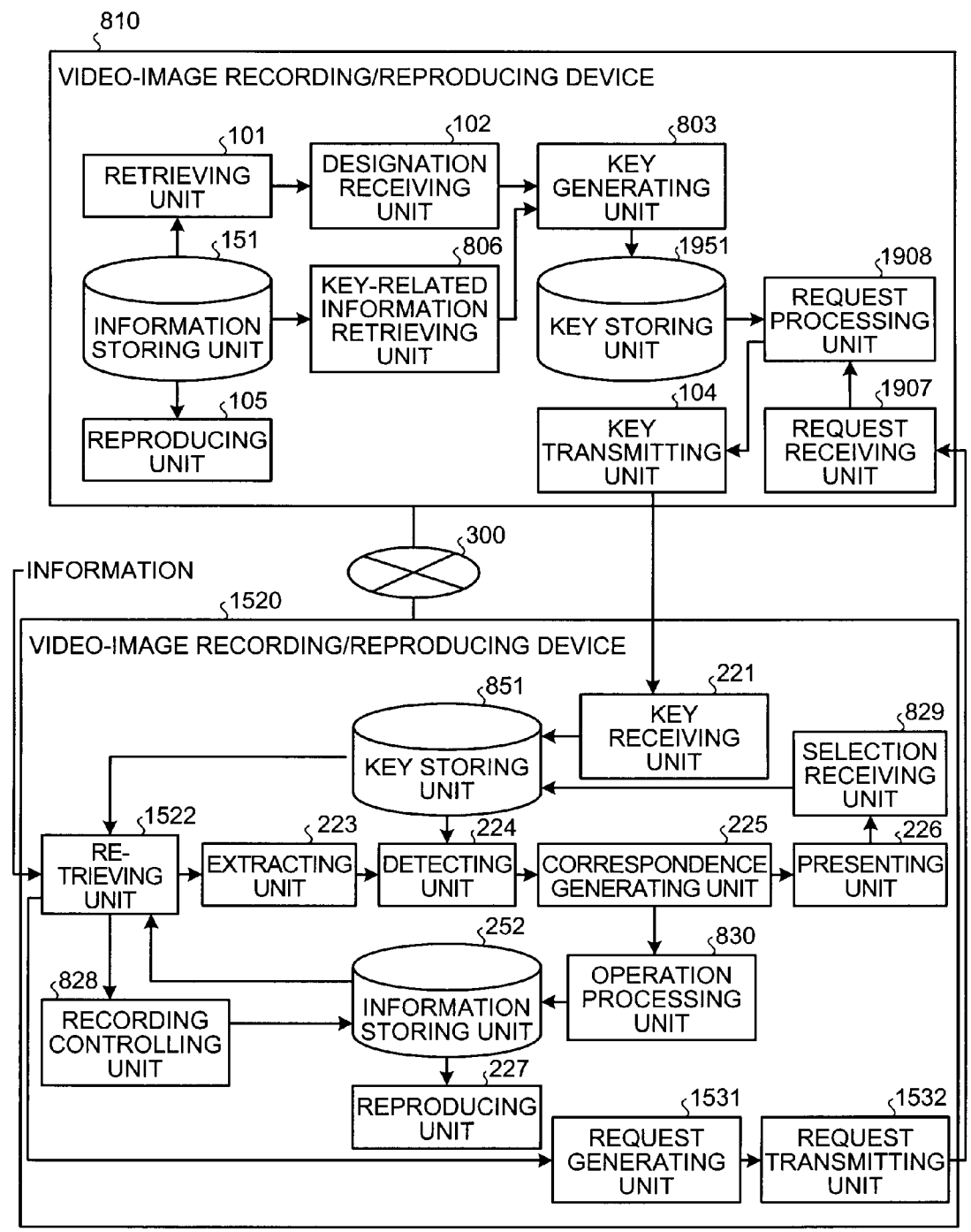
FIG. 19 is a block diagram showing details of a configuration of a information processing system according to a variation example of the third embodiment.

FIG. 19 is a block diagram showing the details of a configuration of an information processing system including a video-image recording/reproducing device 1910 according to a variation example of the third embodiment. The video image recording and reproducing unit 1910 includes the information storing unit 151, a key storing unit 1951, the retrieving unit 101, the designation receiving unit 102, the key generating unit 803, the key transmitting unit 104, the reproducing unit 105, the key-related information retrieving unit 806, a request receiving unit 1907, and a request processing unit 1908.

In other words, the video-image recording/reproducing device 1910 differs from the video-image recording/reproducing device 810 according to the second embodiment in that, in addition to respective components in the video-image recording/reproducing device 810 according to the second embodiment, the video-image recording/reproducing device 1910 includes the key storing unit 1951 equivalent to the key storing unit 1550 in the server 1500, the request receiving unit 1907 equivalent to the request receiving unit 1502, and the request processing unit 1908 equivalent to the request processing unit 1503.

As a result of the above configuration, the video-image recording/reproducing device 1520 and the video-image recording/reproducing device 1910 can directly transmit and receive the request messages and transmit and receive the corresponding key information.

In this way, the information processing apparatus according to the third embodiment can transmit a command requesting the transmission of the retrieval key to the other information processing apparatus or the server apparatus managing the retrieval keys. The information processing apparatus can receive the retrieval key returned in response to the command. As a result, the retrieval key relating to the information retrieved within the information processing apparatus itself can be actively retrieved.

According to each embodiment above, the retrieval key including the feature quantity generated by the other information processing apparatus is used. Therefore, capability during retrieval may not be sufficiently exerted due to differences in feature quantity extracting methods, differences between analog areas and digital areas in analog broadcasts, and the like.

An information processing apparatus according to a fourth embodiment does not use the retrieved retrieval key as it is. The information processing apparatus extracts a different feature quantity from the video image or the audio corresponding with the retrieval key, generates a retrieval key including the extracted feature quantity, and allows use of the generated retrieval key.

Figure 20:
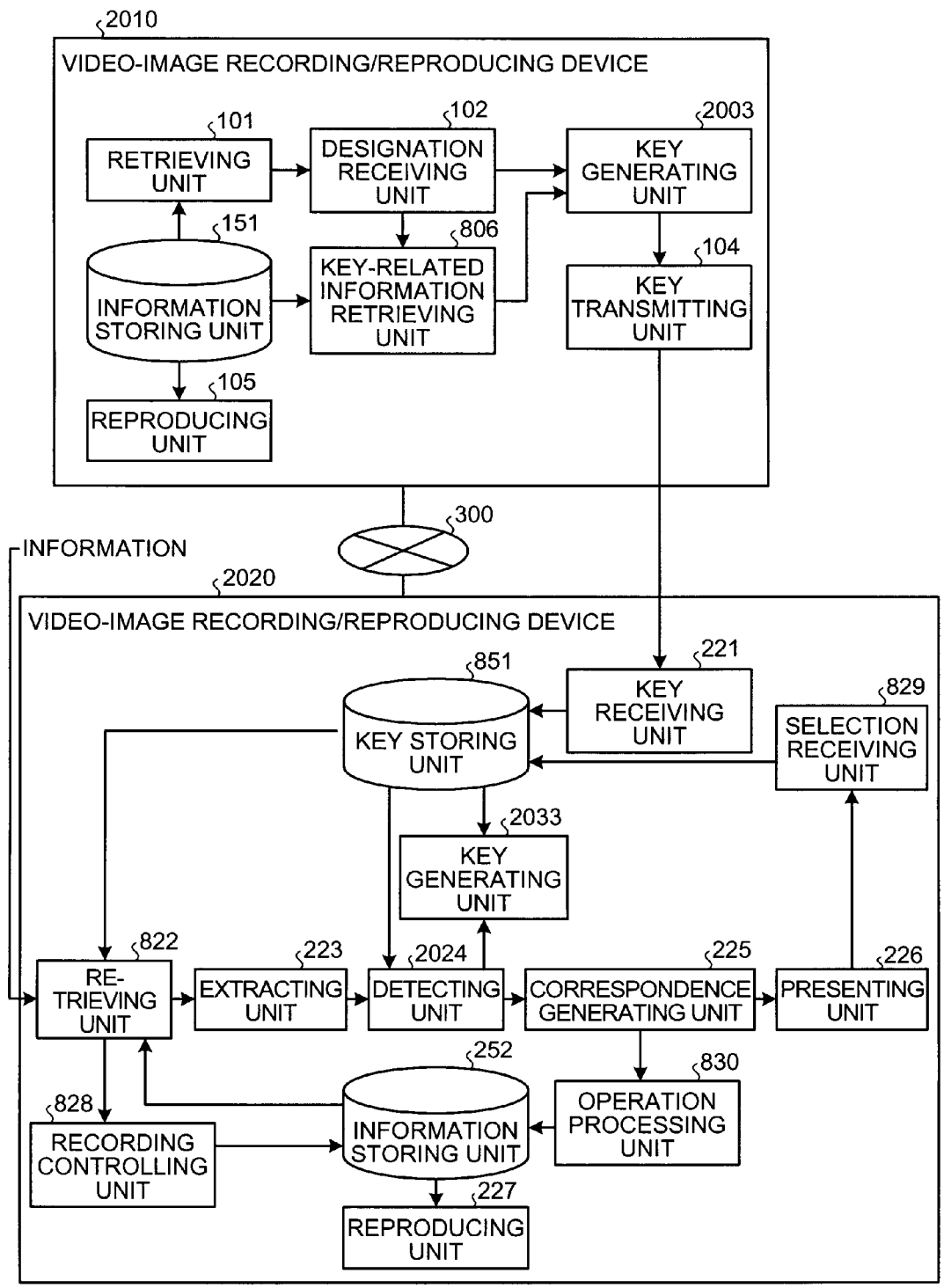
FIG. 20 is a block diagram showing a configuration of an information processing system according a fourth embodiment.

FIG. 20 is a block diagram showing a configuration of an information processing system including a video-image recording/reproducing device 2020 and a video-image recording/reproducing device 2010 according to the fourth embodiment. The video-image recording/reproducing device 2010 is the other information processing apparatus.

The video-image recording/reproducing device 2010 includes the information storing unit 151, the retrieving unit 101, the designation receiving unit 102, a key generating unit 2003, the key transmitting unit 104, the reproducing unit 105, and the key-related information retrieving unit 806.

Functions of the key generating unit 2003 according to the fourth embodiment differ from the key generating unit 803 according to the second embodiment. Other configurations and functions are the same as those in FIG. 8. Therefore, the same configurations and functions are given the same reference numerals. Explanations thereof are omitted.

The key generating unit 2003 can extract a section (first section) designated by the key designating information and generate the feature quantity data, as according to the second embodiment. However, the key generating unit 2003 can extract a section (second section) that is the first section that has been widened or shifted and generate the feature quantity data. The second section includes at least a portion of the first section.

For example, when the first section is a typical sound effect used ten times during a program and a third time is designated, areas other than the typical sound effect can be included through use of the second section that is the first section that has been widened or shifted. As a result, the detecting unit 824 has a higher possibility of retrieving a section corresponding with the third sound effect, rather than the other nine times, as the range information data.

When the feature quantity is generated using the second section, the key generating unit 2003 generates the key information including a section correction information as the key-related information. The section correction information indicates a difference in the range of the first section based on the second section.

The video-image recording/reproducing device 2020 includes the key storing unit 851, the information storing unit 252, the key receiving unit 221, the retrieving unit 822, the extracting unit 223, a detecting unit 2024, the correspondence generating unit 225, the presenting unit 226, the reproducing unit 227, the recording controlling unit 828, the selection receiving unit 829, the operation processing unit 830, and a key generating unit 2033.

The fourth embodiment differs from the second embodiment in that the key generating unit 2033 is added. Functions of the detecting unit 2024 according to the fourth embodiment differ from the detecting unit 824 according to the second embodiment. Other configurations and functions are the same as those in FIG. 8. Therefore, the same configurations and functions are given the same reference numerals. Explanations thereof are omitted.

The detecting unit 2024 differs from the detecting unit 824 according to the second embodiment in that, when the section correction information is included as the key-related information, the detecting unit 2024 references the section correction information and outputs the corrected range information.

The key generating unit 2033 references the range information outputted from the detecting unit 2024 and extracts the video image and audio data of the section corresponding to the retrieval key. The key generating unit 2033 generates a replicate retrieval key that is used when retrieving contents relating to the key information of which the selection is received by the selection receiving unit 829.

The key generating unit 2003 generates the replicate retrieval key using the feature quantity data calculated by a different method than the method for the feature quantity data generated by the key generating unit 2003 of the video-image recording/reproducing device 2010. For example, the video-image recording/reproducing device 2010 generates the feature quantity data set in advance as a standard method allowing exchange with the other device. When the key generating unit 2033 of the video-image recording/reproducing device 2020 generates the replicate retrieval key, the key generating unit 2003 generates the feature quantity data using a unique method.

As a result, even when the retrieval performance declines in the standard method, in the related content retrieval process performed within the information processing apparatus itself, the process can be increased in speed and the like through use of a high-performance replicate retrieval key. The key information of the replicate retrieval key is stored in the key storing unit 851 with the key information of the corresponding retrieval key.

Next, the information processing performed by the video-image recording/reproducing device 2020 according to the fourth embodiment will be described. The details of the key collating process according to the fourth embodiment differ from those according to the second embodiment. Other processes are the same as those in FIG. 9.

Figure 21:
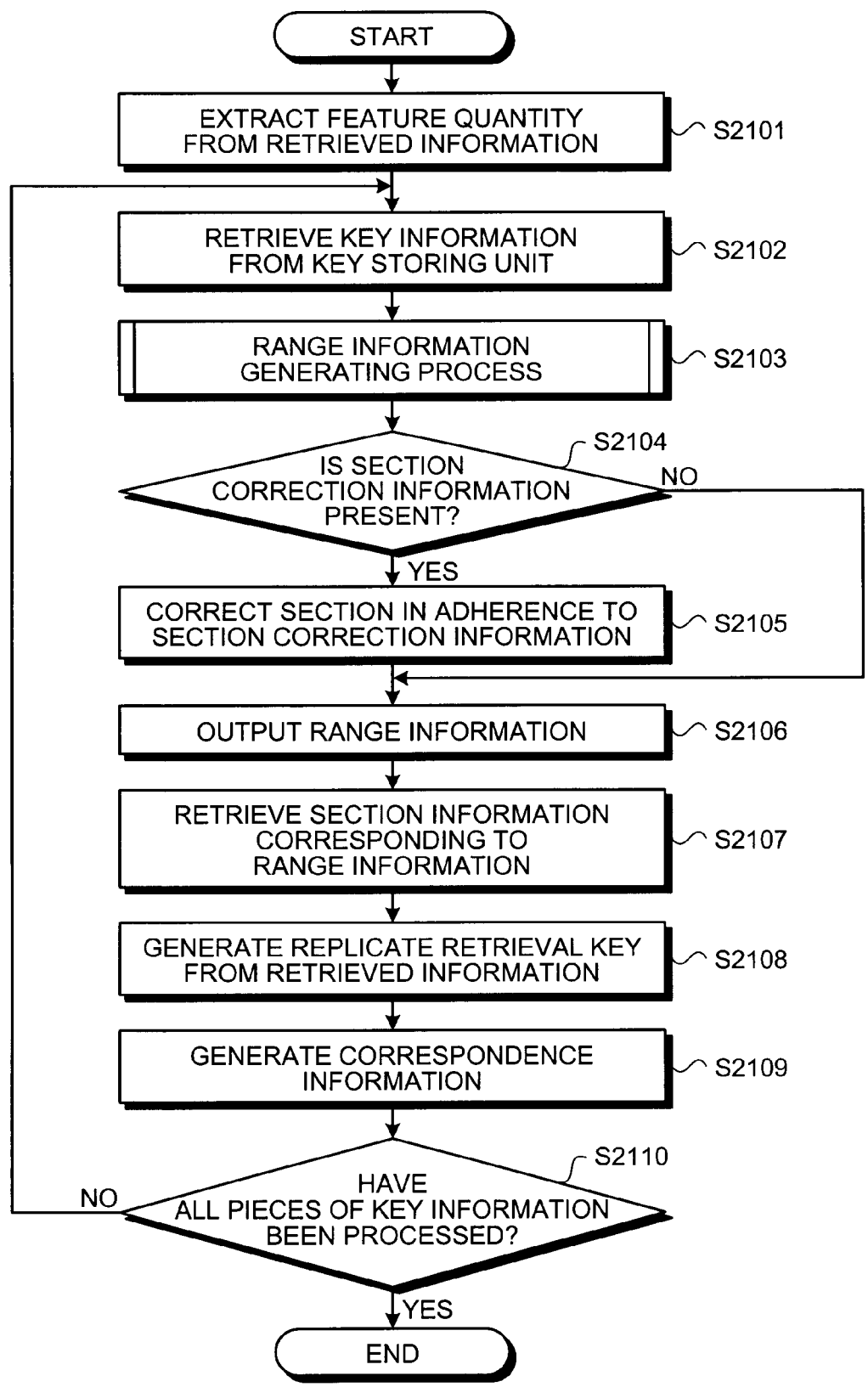
FIG. 21 is a flowchart of an overall flow of a key collating process according to the fourth embodiment.

FIG. 21 is a flowchart of an overall flow of the key collating process according to the fourth embodiment. The feature quantity extracting process and the range information generating process from Step S2101 to Step S2103 are the same processes as those at Step S401 to Step S403 performed by the video-image recording/reproducing device 820 according to the second embodiment. Explanations thereof are omitted.

After the range information generating process, the detecting unit 2024 judges whether the section correction information is included in the key-related information (Step S2104). When the section correction information is included (Step S2104: YES), the range information in corrected in adherence to the section correction information (Step S2105).

After the range information is corrected (Step S2105), or the section correction information is not included in the key-related information (Step S2104: NO), the detecting unit 2024 outputs the range information (Step S2106).

Next, the key generating unit 2033 retrieves the information of the section corresponding to the range information, from among the information retrieved in the process equivalent to Step S305 or Step S306 (Step S2107). The key generating unit 2033 generates the replicate retrieval key from the retrieved information (Step S2108). At this time, the key generating unit 2033 generates the replicate retrieval key using the feature quantity differing from the feature quantity used by the key generating unit 2003 of the video-image recording/reproducing device 2010. The generated replicate retrieval key is stored in the key storing unit 851 and can be used in subsequent related content retrieving processes.

The correspondence information generating process from Step S2109 to Step S2110 is the same process as that at Step S405 to Step S406 performed by the video-image recording/reproducing device 820 according to the second embodiment. Explanations thereof are omitted.

The above process can be performed by all pieces of video image and audio data being retrieved and each step being performed. Alternatively, the video image and audio data can be retrieved in short processing units (frames), and the processes of each step can be successively performed.

An expansion of the key designation section and a relationship with the replicate retrieval key will be described. FIG. 22 is a schematic diagram showing the expansion of the key designation section and a key replication operation according to the fourth embodiment. An upper section of the diagram shows an operation performed by the video-image recording/reproducing device 2010. A lower section of the diagram shows an operation performed by the video-image recording/reproducing device 2020.

The video-image recording/reproducing device 2010 extracts the second section that is the first section 2201 designated by the key designation information that has been widened or shifted and extracts the feature quantity data from the data stored in the information storing unit 151. The video-image recording/reproducing device 2010 generates a transmission key 2202 that is the corresponding key information. The video-image recording/reproducing device 2010 also generates the section correction information that is an amount by which the section has been widened or shifted.

The video-image recording/reproducing device 2020 outputs the range information indicating the section to which the correction has been performed, with reference to the section correction information, on a collation result 2203 of the collation performed using the feature quantity data of the received retrieval key. The video-image recording/reproducing device 2020 also generates the replicate retrieval key 2204 from the corrected range information. Time and the like based on the start of the content are not used. Therefore, the video-image recording/reproducing device 2020 operates without any problems when a shift in a starting time of the content occurs between the video-image recording/reproducing device 2010 and the video-image recording/reproducing device 2020.

In this way, the information processing apparatus according to the fourth embodiment does not use the retrieved retrieval key as is. Instead, the information processing apparatus extracts another feature quantity from the video image or the audio corresponding to the retrieval key, generates the retrieval key including the extracted feature quantity, and uses the generated retrieval key. Therefore, problems such as a reduction in retrieval performance caused by a difference in the feature quantity extracting method or the like can be prevented.

The information processing apparatus according to a fifth embodiment receives a retrieval key further including the key-related information relating to the content that is a generation source from which the retrieval key has been generated and retrieves information with reference to the key-related information. The information processing apparatus also references the key-related information and associates the retrieved information with the retrieval key, giving priority to the information having a larger degree of association with the information that is the generation source of the retrieval key.

Figure 23:
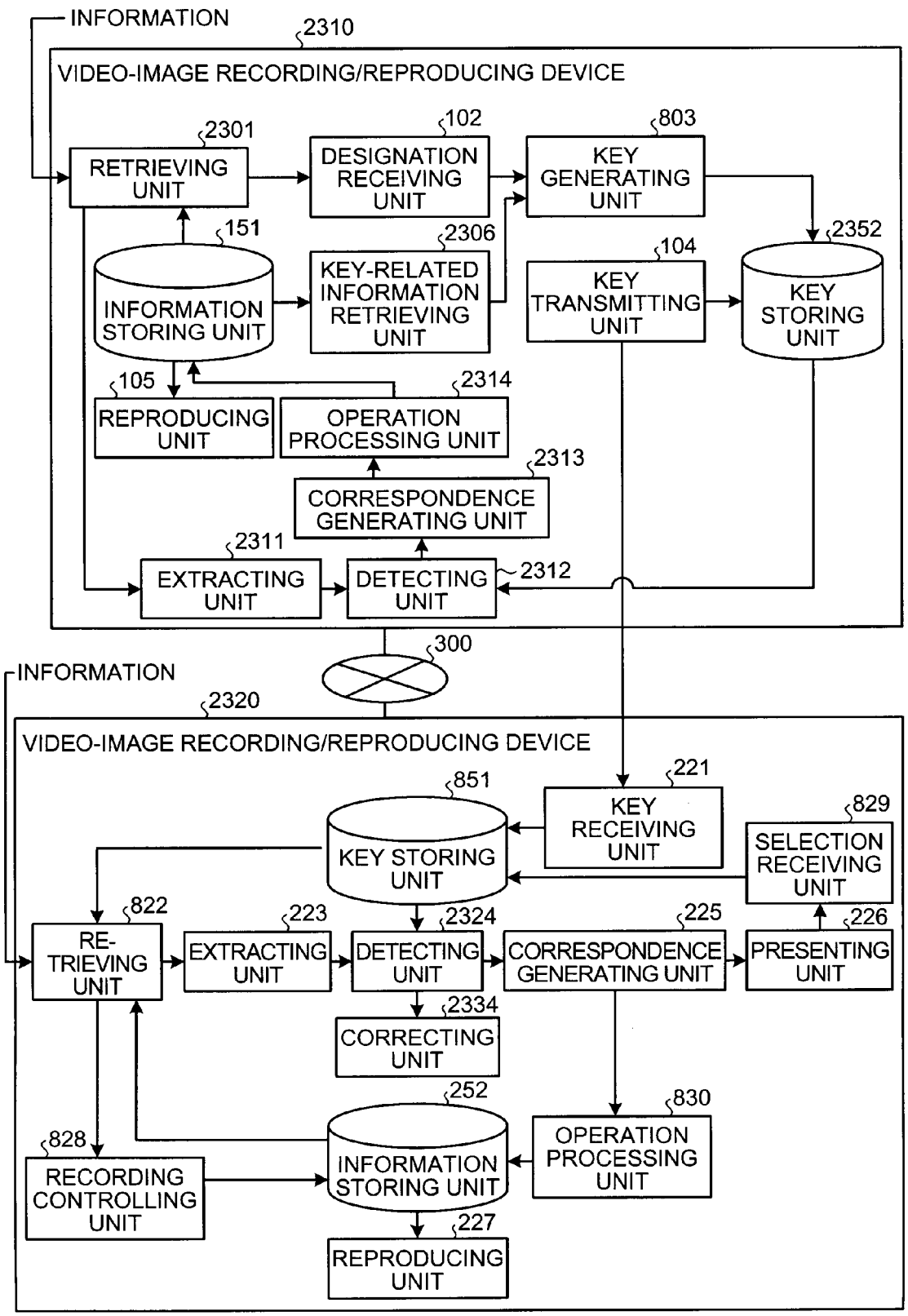
FIG. 23 is a block diagram showing a configuration of an information processing system according a fifth embodiment.

FIG. 23 is a block diagram showing a configuration of an information processing system including a video-image recording/reproducing device 2320 and a video-image recording/reproducing device 2310 according to the fifth embodiment. The video-image recording/reproducing device 2310 is the other information processing apparatus.

The video-image recording/reproducing device 2310 includes the information storing unit 151, a key storing unit 2352, an retrieving unit 2301, the designation receiving unit 102, the key generating unit 803, the key transmitting unit 104, the reproducing unit 105, a key-related information retrieving unit 2306, an extracting unit 2311, a detecting unit 2312, a correspondence generating unit 2313, and an operation processing unit 2314.

The fifth embodiment differs from the second embodiment in that the key storing unit 2352, the extracting unit 2311, the detecting unit 2312, the correspondence generating unit 2313, and the operation processing unit 2314 are added. The retrieving unit 2301 and the key-related information retrieving unit 2306 also differ from the retrieving unit 101 and the key-related information retrieving unit 806 according to the second embodiment. Other configurations and functions are the same as those in FIG. 8. Therefore, the same configurations and functions are given the same reference numerals. Explanations thereof are omitted.

The key storing unit 2352 stores the key information of the retrieval key generated by the key generating unit 803. The key storing unit 2352 can include any commonly used storing medium, such as the HDD, the RAM, the optical disc, or the memory card.

The key storing unit 2352 can store the information of the retrieval key retrieved from another video-image recording/reproducing device 2310 by a key receiving unit (not shown) or the like, as can the key storing unit 851 of the video-image recording/reproducing device 2320. The key storing unit 2352 can also store the retrieval key selected by the selection receiving unit (not shown) or the like.

The retrieving unit 2301 differs from the retrieving unit 101 according to the second embodiment as does the retrieving unit 822 of the video-image recording/reproducing device 2320, in that the video image and audio data is retrieved, stored in the information storing unit 151, and sent to the extracting unit 2311. The retrieving unit 2301 can select and retrieve the video image and audio data with reference to the key-related information included in the key information to retrieve the video image and audio data relating to the retrieval key.

The extracting unit 2311 extracts the feature quantity data from the video image and audio data retrieved by the retrieving unit 222, as does the extracting unit 223 of the video-image recording/reproducing device 2320.

The detecting unit 2312 collates the feature quantity data extracted by the extracting unit 2311 and the feature quantity data included in the retrieval key stored in the key storing unit 2352, in adherence to predetermined conditions, and detects the range information indicating a range to which the feature quantity corresponds, as does the detecting unit 2324 of the video-image recording/reproducing device 2320.

The correspondence generating unit 2313 references the range information detected by the detecting unit 2313 and generates the correspondence information associating the video image and audio data included in the range indicated by the range information with the key information, as does the correspondence generating unit 225 of the video-image recording/reproducing device 2320.

The operation processing unit 2314 performs a process in which the metadata, such as the chapter or the marker, is attached to the video image and audio data recorded with reference to the recording operation attributes included in the key-related information, same as the operation processing unit 830 of the video-image recording/reproducing device 2320.

The key-related information retrieving unit 2306 differs from the key-related information retrieving unit 806 according to the second embodiment in that, when the range information outputted from the detecting unit 2312 is present, the key-related information retrieving unit 2306 references the range information and further retrieves the key-related information relating to the video image and audio data. For example, when the title name and the chapter name of the video image and audio data corresponding with a position or a section satisfying the predetermined condition for a same retrieval key is stored in the information storing unit 151, the key-related information retrieving unit 2306 retrieves the information as the key-related information.

When program attribute information, such as the program ID, the program name (title, group, series, or derivation), the category, the broadcasting station (channel), and the broadcasting date (date, time, or day of the week), of the video image and audio data can be retrieved using the EPG or the like, the key-related information retrieving unit 2306 also retrieves the information as the key-related information. Furthermore, even when information does not directly correspond with the designated section, if the neighboring chapter or marker is retrieved and found, the key-related information retrieving unit 2306 extracts the information of the neighboring chapter or marker and attaches the information, depending on the positional relationship of the designated section and the chapter or marker.

The key-related information retrieving unit 2306 also retrieves information of corresponding chapters and markers recorded by the operation processing unit 2314. In other words, the key-related information retrieving unit 2306 retrieves the information corresponding to the range information outputted by the detecting unit 2312 as the key-related information, in addition to the information of which the designation is directly received by the designation receiving unit 102.

The key-related information retrieving unit 2306 also retrieves the temporal information of the sections designated by the designation receiving unit 102 or, in other words, the section within the content from which the retrieval key has been generated (source section) and the section indicating the range information outputted from the detecting unit 2313 (equivalent section).

In this way, according to the fifth embodiment, the key information may include not only the key-related information corresponding with the key designation information, but also the key-related information relating to a plurality of pieces of information retrieved by the detecting unit 2313. The key information such as these is transmitted to the video-image recording/reproducing device 2320.

Hereafter, the key-related information retrieved for the information of which the key designation information is designated is referred to as key designation information based key-related information. As the information relating to the generated retrieval key, the key-related information relating to the range information detected by the detecting unit 2313 is referred to as the range information based key-related information.

The video-image recording/reproducing device 2320 includes the key storing unit 851, the information storing unit 252, the key receiving unit 221, the retrieving unit 822, the extracting unit 223, a detecting unit 2324, the correspondence generating unit 225, the presenting unit 226, the reproducing unit 227, the recording controlling unit 828, the selection receiving unit 829, the operation processing unit 830, and a correcting unit 2334.

The fifth embodiment differs from the second embodiment in that the correcting unit 2334 is added. Functions of the detecting unit 2324 differ from those of the detecting unit 824 according to the second embodiment. Other configurations and functions are the same as those in FIG. 8. Therefore, the same configurations and functions are given the same reference numerals. Explanations thereof are omitted.

The detecting unit 2324 differs from the detecting unit 824 according to the second embodiment in that a following function is added. When a plurality of pieces of key-related information are included in the key information, the detecting unit 2324 references the key-related information, retrieves the related contents and detects the content from among the retrieved contents, giving priority to the content having the highest degree of association to the information designated in the key-related information.

Specifically, when the pieces of range information satisfying the predetermined conditions can be detected and the key-related information includes the temporal information of the section (source section) from which the retrieval key has been generated, the detecting unit 2324 outputs the range information closest to the time.

The content with the highest degree of association is given priority because, compared to the key-related information based on the range information, for example, the key-related information based on the key designation information is expected to be more accurate. Therefore, the content with the highest degree of association is preferably given priority. In addition, the content with the highest degree of association is preferably given priority because the recorded video image and audio data can be used immediately. Therefore, within the recorded video image and audio data, if the video image and audio data relating to the key-related information based on the key designation information can be retrieved, the video image and audio data is given priority. However, if the video image and audio data cannot be retrieved, the video image and audio data relating to the key-related information based on the pieces of range information can be retrieved. If the video image and audio data relating to the key-related information based on the key designation information can be subsequently retrieved, the video image and audio data relating to the key-related information based on the key designation information can replace the video image and audio data relating to the key-related information based on the pieces of range information.

When the range information near the section from which the retrieval key has been generated (source section) or the section indicating the range information outputted from the detecting unit 2312 of the video-image recording/reproducing device 2310 (equivalent section) in the key-related information is present among the range information satisfying the predetermined conditions, the correcting unit 2334 generates the difference of the temporal information as time correction information. The correcting unit 2334 corrects the time managed within the video-image recording/reproducing device 2320 using the generated time correction information. As a result, for example, the time can be corrected based on the shifts in the time of the same section of the same program in each device.

Next, information processing performed by the video-image recording/reproducing device 2320 according to the fifth embodiment, configured as such, will be described. Details of the range information generating process within the key collating process according to the fifth embodiment differ from those of the second embodiment. Other processes are the same as that in FIG. 9. Explanations thereof are omitted.

Figure 24:
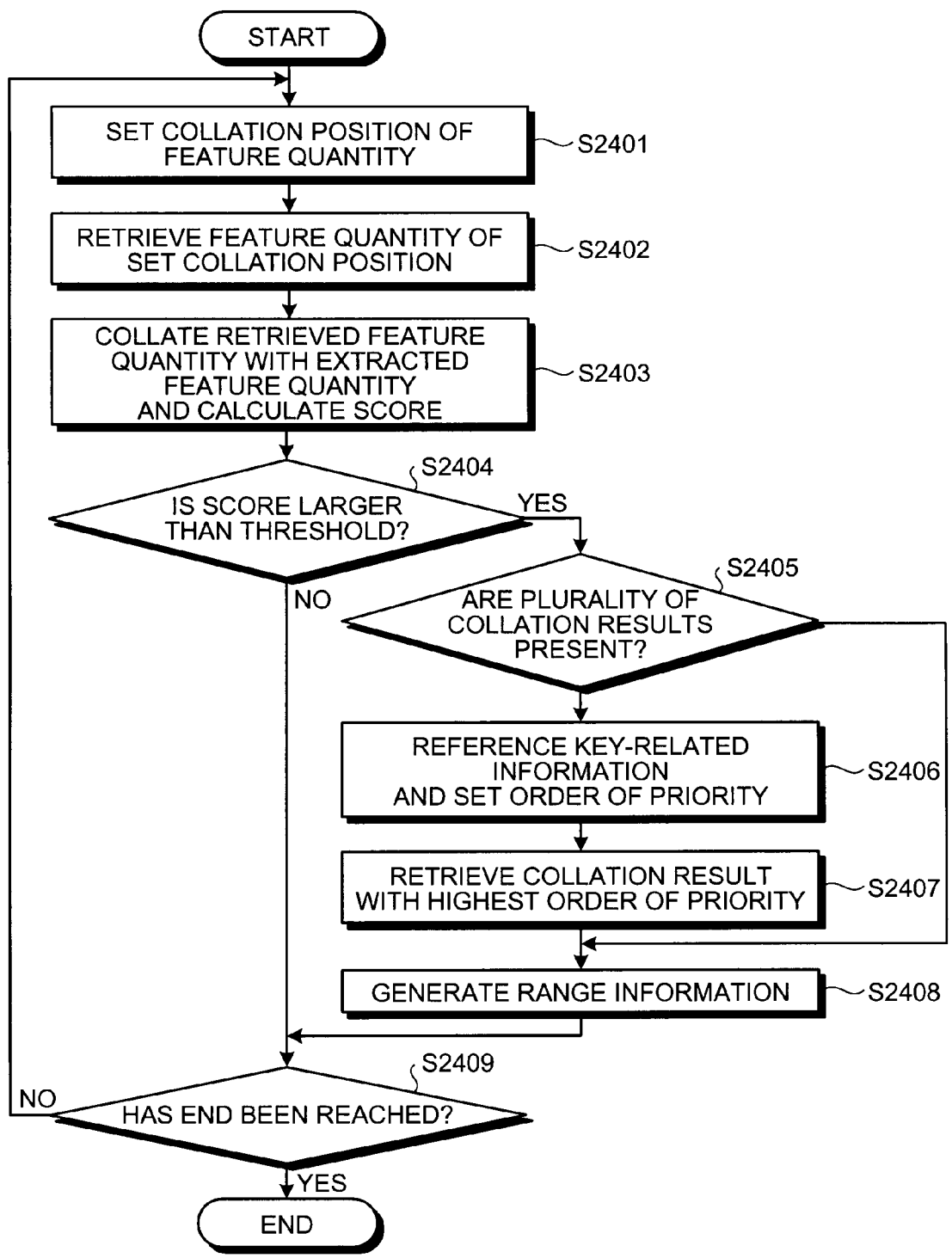
FIG. 24 is a flowchart of an overall flow of a range information generating process according to the fifth embodiment.

FIG. 24 is a flowchart of an overall flow of the range information generating process according to the fifth embodiment.

First, the detecting unit 2324 sets a collation position of the feature quantity data within the retrieved key information (Step S2401). Next, the detecting unit 2324 retrieves the feature quantity data from the set collation position (Step S2402). Then, the detecting unit 2324 collates the extracted feature quantity data with the feature quantity data retrieved at Step S2402 and calculates the score indicating the degree of coincidence of both feature quantity data (Step S2403). When a plurality of pieces of key-related information are included in the key information, the process from Step S2410 to Step S2403 are performed on each piece of key-related information.

Next, the detecting unit 2324 judges whether the calculated score is larger than a predetermined threshold value (Step S2404). When the score is larger than the threshold value (Step S2404: YES), the detecting unit 2324 judges whether a plurality of collation results are present (Step S2405). For example, when the pieces of key-related information are included within the collation result and all scores, calculated by the processes up to Step S2403 being performed on each piece of key-related information, meet the score conditions, the collation results (frame corresponding to the feature quantity data extracted from each key-related information) are retrieved.

When the collation results are present (Step S2405: YES), the detecting unit 2324 references the key-related information and sets an order of priority to each collation result (Step S2406). An order of priority setting method will be described hereafter.

Next, the detecting unit 2324 retrieves the collation result with the highest order of priority (Step S2407). Then, the detecting unit 2324 generates the range information indicating the range corresponding with the retrieved collation result (Step S2408). When judged that the collation results are not present at Step S2405 (Step S2405: NO), the detecting unit 2324 generates the range information indicating the range corresponding with a single collation result and satisfying the condition.

A collation position judging process at Step S2409 is the same as the process at Step S506 performed by the video-image recording/reproducing device 820 according to the second embodiment. Explanations thereof are omitted.

Although the following is not illustrated, when the range information closest to the section included in the key-related information (source section or equivalent section) is present among the range information detected by the detecting unit 2324, the correcting unit 2334 calculates the time correction information that is the difference of both sections. The correcting unit 2334 corrects the time in adherence to the calculated time correction information.

The above-described process can be performed by all pieces of video image and audio data being retrieved and each step being performed. Alternatively, the video image and audio data can be retrieved in short processing units (frames), and the processes at each step can be successively performed.

Next, details of the key information use according to the fifth embodiment will be described. FIG. 25 is a schematic diagram showing an example of the key-related information based on the key designation information. In the example, the key-related information corresponding to each generated retrieval key are the program ID, a program name/program series name, the program category, the broadcasting time, the channel/broadcasting station, and the key designation section.

For example, regarding key-related information 2501 of retrieval key ID=A (key name "HOROSCOPE FEATURE"), the program ID "77101", the program name "MORNING INFORMATION TELEVISION SHOW", the program category "NEWS" and "INFORMATION/VARIETY", the broadcasting date "07/03 (MONDAY) 6:30 to 8:30", the channel/broadcasting station "21/TVX" are managed. The key designation section is from a point 28 minutes, 35 seconds and 00 milliseconds from the start of the program to a point 28 minutes, 39 seconds and 80 milliseconds from the start of the program.

Similarly, key-related information 2502 of the retrieval key ID=B and key-related information 2503 of the retrieval key ID=D are respectively shown. The retrieval key ID=D is the same as that shown in FIG. 13 according to the second embodiment. A title that is a subject of the retrieval key itself is not designated. The program category is "NEWS" and "SPORTS". The program name, program category, and the like serving as the key-related information based on the key-designation information are included.

FIG. 26 is a schematic diagram showing an example of the key-related information based on the range information detected by the detecting unit 2312. The key-related information based on the range information includes an order of priority in addition to the retrieval key ID that is the acquisition source, the program ID, the program name/program series name, the program category, the broadcasting date, the channel/broadcasting station, and the key designation section.

The order of priority is a value by which the degree of association is ranked. The degree of association indicates the degree to which the information corresponding to the detected range information and the information corresponding to the key designation section that is the source are associated. Specifically, a following order of priority is set. When the information is the same as the source section, the value is 0. When the information is same as another section within a same episode of the same program, the value is 1. When the information is the same as a different episode of the same program, the value is 2. When the information is the same as a different program of a same series, the value is 3. When the information is the same as a different program in the same category, the value is 4.

A key-related information 2601, a key-related information 2602, and a key-related information 2603 are all retrieval key ID=A and correspond to the key-related information 2501 in FIG. 25. A key-related information 2601, a key-related information 2604, and a key-related information 2605 are respectively the same section as the key-related information 2501, the key-related information 2502, and the key-related information 2503 in FIG. 25. Therefore, the order of priority is set to 0.

FIG. 27 is an explanatory diagram showing an example of the key-related information corresponding to the range information detected by the detecting unit 2324 of the video-image recording/reproducing device 2320 from the key information including the key-related information such as those shown in FIG. 26.

As in the key-related information of the retrieval key ID=A, the same program can be received by a channel/broadcasting station differing from that of the video recording and reproducing device 2310 and retrieved. The correspondence with the channel/broadcasting station is only required to be separately managed. The correspondence with the channel/broadcasting station can be considered a condition having a low priority. For example, judgment is made only when the correspondence relationship of the program itself is unclear.

Furthermore, as a result of the degree of association with the key-related information shown in FIG. 26, a new order of priority is attached. Specifically, in correspondence with each order of priority from 0 to 2 in the key-related information shown in FIG. 26, the order of priority from 1 to 9 are attached in a sequence of (1) when the information is a same section in a same episode of a same program, (2) when the information is a same section in a different episode of the same program, and (3) when the information is different section in the same program. Furthermore, orders of priority from 10 to 19 are respectively attached in correspondence with the key-related information having orders of priory of 3 and 4 in the key-related information shown in FIG. 26. An error within a predetermined fixed range is permitted in a judgment of the same section can permit.

For example, regarding the retrieval key ID=A, the collation result (order of priority 3) of the same section of a same episode of a same program corresponding with the key-related information of the broadcast on July 7 (order of priority 2) and the key-related information of the broadcast on July 10 (order of priority 2) is present. The key-related information of the broadcast on July 11 is the collation result (order of priority 4) of the same section of a different episode of a same program corresponding to the key-related information of the broadcast on July 3 (order of priority 0). Therefore, the key-related information of the broadcast on July 7 is used as the range information having the higher degree of association or, in other words, the higher order of priority (Step S2407).

Regarding the retrieval key ID=B, the collation result (order of priority 10) of the same section of a same episode of a same program corresponding with the key-related information of the broadcast on July 15 "SPECIAL" (order of priority 3) is present. It is expected that the key-related information of the broadcast on July 16 is the collation result (order of priority 4) of the same section of the different episode of the same program corresponding with the key-related information of the broadcast on July 9 (order of priority 0). Therefore, the key-related information of the broadcast on July 15 can initially be used as the range information. The recording reservation for the broadcast on July 16 can be made. After the video image and audio data is retrieved, the information can be replaced.

Regarding the retrieval key ID=D, there are three pieces of key-related information for the broadcast on July 6 (among which one has an order of priority of 0). There are also three collation results of the same section of the same episode of the same program corresponding to the key-related information of the three broadcasts on 07/06. Among the three collation results, one is a collation result having an order of priority of 1. Therefore, the information closest the order of priority 1 or, in other words, the information closest to the source section is used as the range information.

The judgment method of the order of priority described in FIG. 26 and FIG. 27 is an example. The calculation method for the degree of association (order of priority) is not limited thereto. For example, regarding the retrieval key ID=D in FIG. 27, when the differences between the original section (27 minutes, 13 second and 70 milliseconds to 27 minutes, 14 seconds and 10 milliseconds of the broadcast starting at 23:10 on 07/06) and the three collation results of the same episode of the same program "TODAY'S SPORTS" are calculated, the collation results are 0 seconds and 10 milliseconds, 22 seconds and 80 milliseconds, and 36 seconds and 50 milliseconds. Among these, the result with the smallest difference can be used (0 seconds and 10 milliseconds).

In this way, the information processing apparatus according to the fifth embodiment receives the retrieval key further including the key-related information relating to the content relating to content that is the generation source of the retrieval key. Therefore, through an expansion of the range within which the information is retrieved, more suitable information can be retrieved. Because the retrieval key of information having a high degree of association with reference to the degree of association between information is presented, more effective information can be retrieved.

Figure 28:
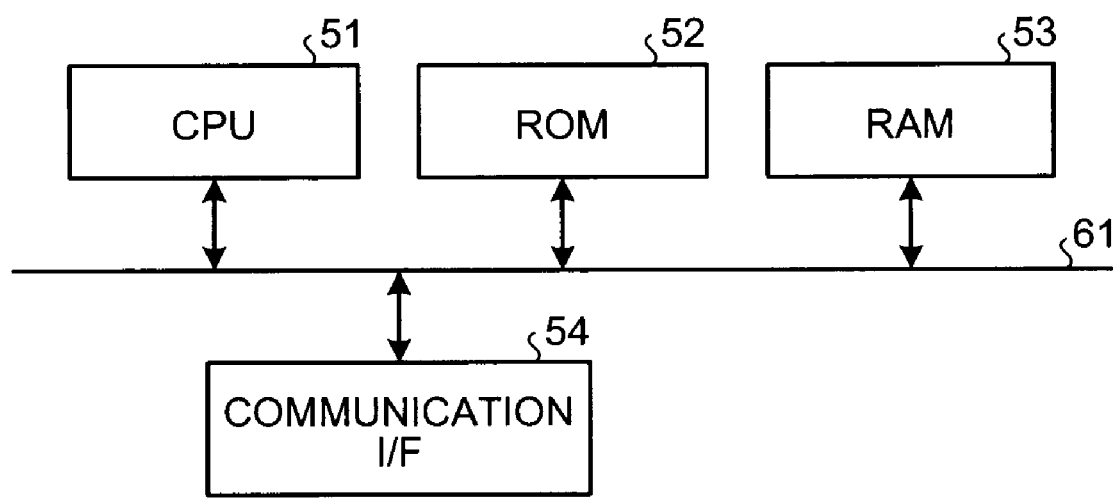
FIG. 28 is an explanatory diagram showing a hardware configuration of an information processing apparatus according to the first embodiment to the fifth embodiment.

FIG. 28 is an explanatory diagram showing a hardware configuration of the information processing apparatus according to the first embodiment to the fifth embodiment.

The information processing apparatus according to the first embodiment to the fifth embodiment includes a control device such as a central processing unit (CPU) 51, a storing device such as a read-only memory (ROM) 52 or a RAM 53, a communication interface (I/F) 54, and a bus 61. The communication I/F 54 is connected to a network and performs communication. The bus 61 connects all components.

An information processing program run by the information processing apparatus according to the first embodiment to the fifth embodiment is installed in advance in the ROM 52 or the like and provided.

The information processing program run by the information processing apparatus according to the first embodiment to the fifth embodiment can be recorded in a recording medium that can be read by a computer, such as a compact disc read-only memory (CD-ROM), a flexible disk (FD), a compact disc-recordable (CD-R), a DVD, or the like and provided.

The information processing program run by the information processing apparatus according to the first embodiment to the fifth embodiment can be stored on a computer connected to a network such as the internet and provided by being downloaded, via the network. The information processing program run by the information processing apparatus according to the first embodiment to the fifth embodiment can be provided or distributed via the network such as the internet.

The information processing program run by the information processing apparatus according to the first embodiment to the fifth embodiment has a module configuration including each component described above (key receiving unit, retrieving unit, extracting unit, detecting unit, correspondence generating unit, presenting unit, reproducing unit, and the like). As actual hardware, the CPU 51 reads the information processing program from the ROM 52 and runs the information processing program. As a result, each component is loaded onto a main storing device and each component is generated in the main storing device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a key storing unit capable of storing key information including a feature quantity of a focused portion in a first content;
a key receiving unit that receives the key information from another information processing apparatus connected via a network and stores the received key information in the key storing unit;
a retrieving unit that retrieves a second content;
an extracting unit that extracts temporally sequential feature quantities from the second content;
a detecting unit that detects from the second content a similar portion where a degree of coincidence between each feature quantity extracted from the second content and the feature quantity included in the key information is higher than a first threshold value, and outputs range information specifying a range of the similar portion;
a correspondence generating unit that retrieves the similar portion included in the range indicated by the detected range information, and generates correspondence information associating the retrieved similar portion with the key information; and
an outputting unit that outputs the key information selectably based on the generated correspondence information.

2. The apparatus according to claim 1, further comprising:
a selection receiving unit that receives an input of the key information selected from the output key information,
wherein, the retrieving unit further retrieves a third content, the extracting unit further extracts the temporally sequential feature quantity from the third content, and
the detecting unit detects from the third content a similar portion where a degree of coincidence between each feature quantity extracted from the third content and the feature quantity included in the key information is higher than the first threshold value, and outputs range information of the similar portion.

3. The apparatus according to claim 1, further comprising:
a request transmitting unit that transmits a request message requesting to retrieve the key information relating to the second content retrieved by the retrieving unit,
wherein, the key receiving unit receives the key information transmitted in correspondence with the request message.

4. The apparatus according to claim 1, further comprising:
a key generating unit that retrieves the similar portion included in the range indicated by the detected range information, extracts other feature quantity different from the feature quantity included in the received key information from the retrieved similar portion, and generates the key information including the other feature quantity.

5. The apparatus according to claim 4, wherein
the key receiving unit receives the key information that includes the feature quantity extracted from other focused portion in the first content and a difference between a range of the focused portion and a range of the other focused portion, the other focused portion including at least a part of the focused portion,
the detecting unit further corrects the detected range information based on the difference, and
the key generating unit retrieves a similar portion included in the range indicated by the corrected range information, extracts the other feature quantity different from the feature quantity included in the received key information from the retrieved similar portion, and generates the key information including the other feature quantity.

6. The apparatus according to claim 1, wherein
the key receiving unit receives the key information further including relation information relating to the first content that is an extraction source of the feature quantity included in the key information, and
the retrieving unit retrieves the second content relating to the received key information based on the related information included in the received key information.

7. The apparatus according to claim 6, wherein
the key receiving unit receives the key information including at least one of identifying information, a name, a type, a provision source, and a provision date of the first content as the related information.

8. The apparatus according to claim 6, wherein
the retrieving unit retrieves a provision date of the second content relating to the key information based on the related information included in the received key information, and retrieves the second content relating to the received key information on the retrieved provision date.

9. The apparatus according to claim 6, wherein
the key receiving unit receives the key information including an attachment manner for attaching metadata to the retrieved second content as the related information, and
the correspondence generating unit attaches the metadata to the similar portion based on the attachment manner, and generates the correspondence information associating the similar portion to which the metadata has been attached with the key information, when the key information including the attachment manner is received.

10. The apparatus according to claim 6, wherein
the key receiving unit receives the key information including the related information of each of a first content that is the extraction source of the feature quantity included in the key information and a fourth content relating to the first content,
the retrieving unit retrieves the second content based on the respective related information of the first content and the fourth content, and
the detecting unit detects the similar portion of the second content having a degree of association being larger than a predetermined second threshold value, the degree of association indicating a degree of association with the first content.

11. The apparatus according to claim 10, wherein
the key receiving unit receives the key information including the provision date of the first content as the related information of the first content, and
the detecting unit detects the range information of the similar portion where a degree of association between the provision date of the similar portion and the provision date of the first content is larger than the second threshold value, from among the similar portions that are the extraction sources of the detected feature quantities.

12. The apparatus according to claim 11, further comprising:
a correcting unit that calculates a difference between the provision date of the similar portion of which the degree of association is larger than the second threshold value and the provision date of the first content, and corrects time based on the calculated difference.

13. The apparatus according to claim 10, wherein
the detecting unit detects the similar portion of the second content where a degree of association between the time information of the focused portion of the first content and the time information of the similar portion of the second content is larger than the second threshold value.

14. The apparatus according to claim 1, further comprising:
an information storing unit that stores the second content,
wherein, the retrieving unit retrieves the second content from the information storing unit.

15. The apparatus according to claim 1, wherein
the retrieving unit retrieves the second content via a network, from an external device providing the second content.

16. The apparatus according to claim 1, wherein
the key receiving unit receives the key information including the feature quantity incapable of decoding the similar portion.

17. The apparatus according to claim 1, wherein
the key receiving unit receives the key information including the feature quantity that is encrypted feature quantity capable of decoding the similar portion.

18. A computer program product having a computer readable medium including programmed instructions for processing a content, wherein the instructions, when executed by a computer, cause the computer to perform:
receiving key information including a feature quantity of a focused portion of a first content from another information processing apparatus connected via a network;
storing the received key information in a key storing unit;
retrieving a second content;
extracting temporally sequential feature quantities from the second content;
detecting from the second content a similar portion where a degree of coincidence between each feature quantity extracted from the second content and the feature quantity included in the key information is higher than a first threshold value;
outputting range information specifying a range of the similar section;
retrieving the similar portion included in the range indicated by the detected range information;
generating correspondence information associating the retrieved similar portion with the key information; and
outputting the key information selectably based on the generated correspondence information.

19. An information processing system comprising:
a first information processing apparatus that generates a retrieval key for a retrieved first content; and
a second information processing apparatus that is connected to the first information processing apparatus via a network and retrieves a second content relating to the retrieval key, wherein
the first information processing apparatus includes
a first retrieving unit that retrieves the first content,
a designation receiving unit that receives a designation of a subject content that is a portion or all of the retrieved first content and from which a feature quantity indicating a characteristic of the first content is to be extracted,
a key generating unit that extracts the feature quantity from the subject content to which the designation has been received, and generates key information including the extracted feature quantity as the retrieval key of the content, and
a key transmitting unit that transmits the generated key information to the second information processing apparatus, and
the second information processing apparatus includes
a key storing unit capable of storing the key information,
a key receiving unit that receives the key information from the first information processing apparatus and stores the received key information in the key storing unit,
a second retrieving unit that retrieves the second content,
an extracting unit that extracts temporally sequential feature quantities from the second content,
a detecting unit that detects from the second content a similar portion where a degree of coincidence between each feature quantity extracted from the second content and the feature quantity included in the key information is higher than a first threshold value, and outputs range information specifying a range of the similar portion,
a correspondence generating unit that retrieves the similar portion included in the range indicated by the detected range information, and generates correspondence information associating the retrieved similar portion with the key information, and
a outputting unit that outputs the key information selectably based on the generated correspondence information.

20. An information processing system comprising:
a first information processing apparatus that generates a retrieval key for a retrieved first content;
a server apparatus that is connected to the first information processing apparatus via a network and manages a retrieval key; and
a second information processing apparatus that is connected to the server apparatus via the network and retrieves a second content relating to the retrieval key, wherein, the first information processing apparatus includes
a first retrieving unit that retrieves the first content,
a designation receiving unit that receives a designation of a subject content that is a portion or all of the retrieved first content and from which a feature quantity indicating a characteristic of the first content is to be extracted,
a key generating unit that extracts the feature quantity from the subject content to which the designation has been received, and generates key information including the extracted feature quantity as the retrieval key of the content, and
a first key transmitting unit that transmits the generated key information to the server apparatus,
the server apparatus includes
a first key storing unit capable of storing the key information,
a first key receiving unit that receives the key information from the first information processing apparatus and stores the received key information in the first key storing unit,
a request receiving unit that receives a request message requesting to retrieve the key information, and
a second key transmitting unit that retrieves the key information from the first key storing unit in correspondence with the received request message and transmits the retrieved key information to the second information processing unit, and
the second information processing apparatus includes
a second key storing unit capable of storing the key information,
a second key receiving unit that receives the key information from the server apparatus and stores the received key information in the second key storing unit,
a second retrieving unit that retrieves the second content,
an extracting unit that extracts temporally sequential feature quantities from the second content, a detecting unit that detects from the second content a similar portion where a degree of coincidence between each feature quantity extracted from the second content and the feature quantity included in the key information is higher than a first threshold value, and outputs range information specifying a range of the similar portion, a correspondence generating unit that retrieves the similar portion included in the range indicated by the detected range information, and generates correspondence information associating the retrieved similar portion with the key information, and a outputting unit that outputs the key information selectably based on the generated correspondence information.

* * * * *